(12) United States Patent
Border et al.

(10) Patent No.: US 9,091,851 B2
(45) Date of Patent: Jul. 28, 2015

(54) LIGHT CONTROL IN HEAD MOUNTED DISPLAYS

(75) Inventors: John N. Border, Walworth, NY (US); Joseph Bietry, Chili, CA (US); John D. Haddick, San Rafael, CA (US); Robert Michael Lohse, Palo Alto, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 691 days.

(21) Appl. No.: 13/357,815

(22) Filed: Jan. 25, 2012

(65) Prior Publication Data
US 2012/0119978 A1    May 17, 2012

Related U.S. Application Data

(63) Continuation-in-part of application No. 13/037,324, filed on Feb. 28, 2011, and a continuation-in-part of application No. 13/037,335, filed on Feb. 28, 2011.

(60) Provisional application No. 61/308,973, filed on Feb.
(Continued)

(51) Int. Cl.
*G02B 5/30* (2006.01)
*G09G 5/00* (2006.01)
*G02B 27/01* (2006.01)

(52) U.S. Cl.
CPC .............. *G02B 27/0172* (2013.01); *G02B 5/30* (2013.01); *G02B 2027/0118* (2013.01); *G02B 2027/0178* (2013.01)

(58) Field of Classification Search
CPC ................. G02B 27/0172; G02B 5/30; G02B 2027/0118; G02B 2027/0178
USPC ........... 359/485.01, 488.01, 613, 631; 345/8; 705/14.58
See application file for complete search history.

(56) References Cited

U.S. PATENT DOCUMENTS 3,152,215 A    10/1964    Barstow et al.
RE27,356 E    5/1972    La Russa
(Continued)

FOREIGN PATENT DOCUMENTS

EP    0562742 A1    9/1993
EP    0807917 A2    11/1997
(Continued)

OTHER PUBLICATIONS

Starner, Thad et al., "Augmented Reality Through Wearable Computing", MIT Media Laboratory Perceptual Computing Section Technical Report, vol. 397, Jan. 1, 1997, 9 pages.
(Continued)

*Primary Examiner* — Frank Font
(74) *Attorney, Agent, or Firm* — Jeremy Snodgrass; Judy Yee; Micky Minhas

(57) ABSTRACT

A see-through head mounted display apparatus with reduced eyeglow is disclosed. Two images of a scene are combined and presented to a user, the combined image including portions of reflected image light and light from a see-through view of an external environment. The apparatus includes a light control element to block escaping portions of image light and reflected portions of scene light, while allowing incoming scene light to be transmitted from the external environment. The images are produced using a partially reflecting mirror and a light control element. A portion of scene light is transmitted through the partially reflecting mirror and is combined with a portion of image light reflected from the partially reflecting mirror. A light control element is used to block a portion of the image light and a portion of the scene light to reduce eyeglow.

36 Claims, 10 Drawing Sheets

Related U.S. Application Data 28, 2010, provisional application No. 61/373,791, filed on Aug. 13, 2010, provisional application No. 61/382,578, filed on Sep. 14, 2010, provisional application No. 61/410,983, filed on Nov. 8, 2010, provisional application No. 61/429,445, filed on Jan. 3, 2011, provisional application No. 61/429,447, filed on Jan. 3, 2011.

(56) References Cited

U.S. PATENT DOCUMENTS

| | | |
|---|---|---|
| 3,940,203 A | 2/1976 | La Russa |
| 3,966,303 A | 6/1976 | Yamamoto |
| 4,026,641 A | 5/1977 | Bosserman et al. |
| 4,257,062 A | 3/1981 | Meredith |
| 4,277,980 A | 7/1981 | Coats et al. |
| 4,347,508 A | 8/1982 | Spooner |
| 4,376,404 A | 3/1983 | Haddad |
| 4,394,656 A | 7/1983 | Goettsche |
| 4,398,805 A | 8/1983 | Cole |
| 4,453,327 A | 6/1984 | Clarke |
| 4,526,473 A | 7/1985 | Zahn, III |
| 4,537,739 A | 8/1985 | Ruhl |
| 4,567,513 A | 1/1986 | Imsand |
| 4,643,789 A | 2/1987 | Parker et al. |
| 4,669,810 A | 6/1987 | Wood |
| 4,711,512 A | 12/1987 | Upatnieks |
| 4,713,658 A | 12/1987 | Swinton |
| 4,751,691 A | 6/1988 | Perera |
| 4,763,990 A | 8/1988 | Wood |
| 4,772,942 A | 9/1988 | Tuck |
| 4,776,045 A | 10/1988 | Mysliwiec et al. |
| 4,790,629 A | 12/1988 | Rand |
| 4,796,987 A | 1/1989 | Linden |
| 4,799,765 A | 1/1989 | Ferrer |
| 4,822,160 A | 4/1989 | Tsai |
| 4,830,464 A | 5/1989 | Cheysson et al. |
| 4,859,031 A | 8/1989 | Berman et al. |
| 4,869,575 A | 9/1989 | Kubik |
| 4,886,958 A | 12/1989 | Merryman et al. |
| 4,904,078 A | 2/1990 | Gorike |
| 4,934,773 A | 6/1990 | Becker |
| 4,949,580 A | 8/1990 | Graham et al. |
| 4,961,626 A | 10/1990 | Fournier, Jr. et al. |
| 4,973,952 A | 11/1990 | Malec et al. |
| 5,003,300 A | 3/1991 | Wells |
| 5,029,963 A | 7/1991 | Naselli et al. |
| 5,076,664 A | 12/1991 | Migozzi |
| 5,103,713 A | 4/1992 | Loving |
| 5,134,521 A | 7/1992 | Lacroix et al. |
| 5,151,722 A | 9/1992 | Massof et al. |
| 5,162,828 A | 11/1992 | Furness et al. |
| 5,191,319 A | 3/1993 | Kiltz |
| 5,210,626 A | 5/1993 | Kumayama et al. |
| 5,212,821 A | 5/1993 | Gorin et al. |
| 5,227,769 A | 7/1993 | Leksell et al. |
| 5,258,785 A | 11/1993 | Dawkins, Jr. |
| 5,266,977 A | 11/1993 | Linden |
| 5,276,471 A | 1/1994 | Yamauchi et al. |
| 5,281,957 A | 1/1994 | Schoolman |
| 5,286,471 A | 2/1994 | Hung |
| 5,305,244 A | 4/1994 | Newman et al. |
| 5,325,242 A | 6/1994 | Fukuchi et al. |
| 5,343,313 A | 8/1994 | Fergason |
| 5,357,372 A | 10/1994 | Chen et al. |
| 5,436,639 A | 7/1995 | Arai et al. |
| 5,436,765 A | 7/1995 | Togino |
| 5,446,588 A | 8/1995 | Missig et al. |
| 5,467,104 A | 11/1995 | Furness, III et al. |
| 5,479,224 A | 12/1995 | Yasugaki et al. |
| 5,483,307 A | 1/1996 | Anderson |
| 5,506,730 A | 4/1996 | Morley et al. |
| 5,513,041 A | 4/1996 | Togino |
| 5,513,129 A | 4/1996 | Bolas et al. |
| 5,517,366 A | 5/1996 | Togino |
| 5,526,183 A | 6/1996 | Chen |
| 5,530,865 A | 6/1996 | Owens et al. |
| 5,561,538 A | 10/1996 | Kato et al. |
| D375,495 S | 11/1996 | MacIness et al. |
| 5,572,229 A | 11/1996 | Fisher |
| 5,572,343 A | 11/1996 | Okamura et al. |
| 5,572,596 A | 11/1996 | Wildes et al. |
| 5,585,871 A | 12/1996 | Linden |
| 5,587,836 A | 12/1996 | Takahashi et al. |
| 5,594,563 A | 1/1997 | Larson |
| 5,594,588 A | 1/1997 | Togino |
| 5,596,433 A | 1/1997 | Konuma |
| 5,596,451 A | 1/1997 | Handschy et al. |
| 5,601,078 A | 2/1997 | Schaller et al. |
| 5,606,458 A | 2/1997 | Fergason |
| 5,615,132 A | 3/1997 | Horton et al. |
| 5,619,377 A | 4/1997 | Rallison |
| 5,623,479 A | 4/1997 | Takahashi |
| 5,625,765 A | 4/1997 | Ellenby et al. |
| 5,635,948 A | 6/1997 | Tonosaki |
| 5,644,436 A | 7/1997 | Togino et al. |
| 5,646,783 A | 7/1997 | Banbury |
| 5,654,828 A | 8/1997 | Togino et al. |
| 5,659,327 A | 8/1997 | Furness, III et al. |
| 5,659,430 A | 8/1997 | Togino |
| 5,661,603 A | 8/1997 | Hanano et al. |
| 5,677,801 A | 10/1997 | Fukuchi et al. |
| 5,682,196 A | 10/1997 | Freeman |
| 5,689,619 A | 11/1997 | Smyth |
| 5,696,521 A | 12/1997 | Robinson et al. |
| 5,699,194 A | 12/1997 | Takahashi |
| 5,701,202 A | 12/1997 | Takahashi |
| 5,703,605 A | 12/1997 | Takahashi et al. |
| 5,706,026 A | 1/1998 | Kent et al. |
| 5,715,337 A | 2/1998 | Spitzer et al. |
| 5,717,422 A | 2/1998 | Fergason |
| 5,724,463 A | 3/1998 | Deacon et al. |
| 5,726,620 A | 3/1998 | Arikawa |
| 5,726,670 A | 3/1998 | Tabata et al. |
| 5,726,807 A | 3/1998 | Nakaoka et al. |
| 5,734,357 A | 3/1998 | Matsumoto |
| 5,734,505 A | 3/1998 | Togino et al. |
| 5,742,262 A | 4/1998 | Tabata et al. |
| 5,742,263 A | 4/1998 | Wang et al. |
| 5,745,295 A | 4/1998 | Takahashi |
| 5,745,380 A | 4/1998 | Sandvoss et al. |
| 5,748,378 A | 5/1998 | Togino et al. |
| 5,751,494 A | 5/1998 | Takahashi |
| 5,751,836 A | 5/1998 | Wildes et al. |
| 5,754,344 A | 5/1998 | Fujiyama |
| 5,757,544 A | 5/1998 | Tabata et al. |
| 5,760,931 A | 6/1998 | Saburi et al. |
| 5,764,785 A | 6/1998 | Jones et al. |
| 5,768,024 A | 6/1998 | Takahashi |
| 5,768,025 A | 6/1998 | Togino et al. |
| 5,768,039 A | 6/1998 | Togino |
| 5,774,558 A | 6/1998 | Drucker |
| 5,777,715 A | 7/1998 | Kruegle et al. |
| 5,781,913 A | 7/1998 | Felsenstein et al. |
| 5,790,184 A | 8/1998 | Sato et al. |
| 5,790,311 A | 8/1998 | Togino |
| 5,790,312 A | 8/1998 | Togino |
| 5,793,339 A | 8/1998 | Takahashi |
| 5,796,373 A | 8/1998 | Ming-Yen |
| 5,801,704 A | 9/1998 | Oohara et al. |
| 5,805,167 A | 9/1998 | van Cruyningen |
| 5,808,800 A | 9/1998 | Handschy et al. |
| 5,812,100 A | 9/1998 | Kuba |
| 5,812,323 A | 9/1998 | Takahashi |
| 5,815,326 A | 9/1998 | Takahashi |
| 5,815,411 A | 9/1998 | Ellenby et al. |
| 5,818,641 A | 10/1998 | Takahashi |
| 5,831,712 A | 11/1998 | Tabata et al. |
| 5,844,392 A | 12/1998 | Peurach et al. |
| 5,844,824 A | 12/1998 | Newman et al. |
| 5,854,697 A | 12/1998 | Caulfield et al. |
| 5,875,056 A | 2/1999 | Takahashi |
| 5,883,606 A | 3/1999 | Smoot |

(56) References Cited

U.S. PATENT DOCUMENTS

| | | | |
|---|---|---|---|
| 5,886,822 | A | 3/1999 | Spitzer |
| 5,886,824 | A | 3/1999 | Takahashi |
| 5,909,183 | A | 6/1999 | Borgstahl et al. |
| 5,909,317 | A | 6/1999 | Nakaoka et al. |
| 5,909,325 | A | 6/1999 | Kuba et al. |
| 5,912,650 | A | 6/1999 | Carollo |
| 5,923,477 | A | 7/1999 | Togino |
| 5,926,144 | A | 7/1999 | Bolanos et al. |
| 5,933,811 | A | 8/1999 | Angles et al. |
| 5,936,610 | A | 8/1999 | Endo |
| 5,940,218 | A | 8/1999 | Takahashi |
| 5,943,171 | A | 8/1999 | Budd et al. |
| 5,949,583 | A | 9/1999 | Rallison et al. |
| 5,959,780 | A | 9/1999 | Togino et al. |
| 5,974,413 | A | 10/1999 | Beauregard et al. |
| 5,982,343 | A | 11/1999 | Iba et al. |
| 5,986,812 | A | 11/1999 | Takahashi |
| 5,986,813 | A | 11/1999 | Saikawa et al. |
| 5,991,085 | A | 11/1999 | Rallison et al. |
| 5,991,103 | A | 11/1999 | Togino |
| 6,006,227 | A | 12/1999 | Freeman et al. |
| 6,008,778 | A | 12/1999 | Takahashi et al. |
| 6,008,946 | A | 12/1999 | Knowles |
| 6,009,435 | A | 12/1999 | Taubin et al. |
| 6,014,261 | A | 1/2000 | Takahashi |
| 6,018,423 | A | 1/2000 | Takahashi |
| 6,023,372 | A | 2/2000 | Spitzer et al. |
| 6,028,608 | A | 2/2000 | Jenkins |
| 6,028,709 | A | 2/2000 | Takahashi |
| 6,034,653 | A | 3/2000 | Robertson et al. |
| 6,037,914 | A | 3/2000 | Robinson |
| 6,040,945 | A | 3/2000 | Karasawa |
| 6,041,193 | A | 3/2000 | Aoki |
| 6,045,229 | A | 4/2000 | Tachi et al. |
| 6,046,712 | A | 4/2000 | Beller et al. |
| 6,060,933 | A | 5/2000 | Jordan et al. |
| 6,073,443 | A | 6/2000 | Okada et al. |
| 6,078,411 | A | 6/2000 | Aoki |
| 6,078,704 | A | 6/2000 | Bischel et al. |
| 6,084,556 | A | 7/2000 | Zwern |
| 6,085,428 | A | 7/2000 | Casby et al. |
| 6,088,165 | A | 7/2000 | Janeczko et al. |
| 6,091,546 | A | 7/2000 | Spitzer |
| 6,091,832 | A | 7/2000 | Shurman et al. |
| 6,091,910 | A | 7/2000 | Mihara |
| 6,094,283 | A | 7/2000 | Preston |
| 6,097,354 | A | 8/2000 | Takahashi et al. |
| 6,097,542 | A | 8/2000 | Takahashi et al. |
| 6,101,038 | A | 8/2000 | Hebert et al. |
| 6,118,888 | A | 9/2000 | Chino et al. |
| 6,118,908 | A | 9/2000 | Bischel et al. |
| 6,124,954 | A | 9/2000 | Popovich et al. |
| 6,124,977 | A | 9/2000 | Takahashi |
| 6,127,990 | A | 10/2000 | Zwern |
| 6,128,136 | A | 10/2000 | Togino et al. |
| 6,130,784 | A | 10/2000 | Takahashi |
| 6,134,051 | A | 10/2000 | Hayakawa et al. |
| 6,135,951 | A | 10/2000 | Richardson et al. |
| 6,137,042 | A | 10/2000 | Kurtzberg et al. |
| 6,140,980 | A | 10/2000 | Spitzer et al. |
| 6,141,465 | A | 10/2000 | Bischel et al. |
| 6,147,678 | A | 11/2000 | Kumar et al. |
| 6,151,061 | A | 11/2000 | Tokuhashi |
| 6,154,314 | A | 11/2000 | Takahashi |
| 6,160,551 | A | 12/2000 | Naughton et al. |
| 6,160,666 | A | 12/2000 | Rallison et al. |
| 6,166,679 | A | 12/2000 | Lemelson et al. |
| 6,166,744 | A | 12/2000 | Jaszlics et al. |
| 6,167,169 | A | 12/2000 | Brinkman et al. |
| 6,167,413 | A | 12/2000 | Daley, III |
| 6,169,613 | B1 | 1/2001 | Amitai et al. |
| 6,172,657 | B1 | 1/2001 | Kamakura et al. |
| 6,181,475 | B1 | 1/2001 | Togino et al. |
| 6,185,045 | B1 | 2/2001 | Hanano |
| 6,193,375 | B1 | 2/2001 | Nagata et al. |
| 6,195,136 | B1 | 2/2001 | Handschy et al. |
| 6,195,207 | B1 | 2/2001 | Takahashi |
| 6,201,557 | B1 | 3/2001 | Kitazawa et al. |
| 6,201,629 | B1 | 3/2001 | McClelland et al. |
| 6,201,646 | B1 | 3/2001 | Togino et al. |
| 6,204,974 | B1 | 3/2001 | Spitzer |
| 6,211,976 | B1 | 4/2001 | Popovich et al. |
| 6,215,593 | B1 | 4/2001 | Bruce |
| 6,222,675 | B1 | 4/2001 | Mall et al. |
| 6,222,676 | B1 | 4/2001 | Togino et al. |
| 6,222,677 | B1 | 4/2001 | Budd et al. |
| RE37,169 | E | 5/2001 | Togino |
| RE37,175 | E | 5/2001 | Takahashi |
| 6,229,503 | B1 | 5/2001 | Mays, Jr. et al. |
| 6,232,934 | B1 | 5/2001 | Heacock et al. |
| 6,236,037 | B1 | 5/2001 | Asada et al. |
| 6,243,054 | B1 | 6/2001 | DeLuca |
| 6,243,755 | B1 | 6/2001 | Takagi et al. |
| 6,244,703 | B1 | 6/2001 | Resnikoff et al. |
| 6,246,527 | B1 | 6/2001 | Hayakawa et al. |
| 6,252,728 | B1 | 6/2001 | Togino |
| 6,252,989 | B1 | 6/2001 | Geisler et al. |
| RE37,292 | E | 7/2001 | Togino et al. |
| 6,263,022 | B1 | 7/2001 | Chen et al. |
| 6,271,808 | B1 | 8/2001 | Corbin |
| 6,278,556 | B1 | 8/2001 | Togino |
| 6,295,145 | B1 | 9/2001 | Popovich |
| 6,304,234 | B1 | 10/2001 | Horiuchi |
| 6,304,303 | B1 | 10/2001 | Yamanaka |
| 6,307,589 | B1 | 10/2001 | Maquire, Jr. |
| 6,313,950 | B1 | 11/2001 | Hayakawa et al. |
| 6,317,267 | B1 | 11/2001 | Takahashi |
| 6,323,807 | B1 | 11/2001 | Golding et al. |
| 6,327,074 | B1 | 12/2001 | Bass et al. |
| 6,329,986 | B1 | 12/2001 | Cheng |
| 6,333,815 | B1 | 12/2001 | Takahashi |
| 6,333,820 | B1 | 12/2001 | Hayakawa et al. |
| 6,349,001 | B1 | 2/2002 | Spitzer |
| 6,349,337 | B1 | 2/2002 | Parsons, Jr. et al. |
| RE37,579 | E | 3/2002 | Takahashi |
| 6,353,492 | B2 | 3/2002 | McClelland et al. |
| 6,353,503 | B1 | 3/2002 | Spitzer et al. |
| 6,356,392 | B1 | 3/2002 | Spitzer |
| 6,359,603 | B1 | 3/2002 | Zwern |
| 6,359,723 | B1 | 3/2002 | Handschy et al. |
| 6,363,160 | B1 | 3/2002 | Bradski et al. |
| 6,369,952 | B1 | 4/2002 | Rallison et al. |
| 6,384,982 | B1 | 5/2002 | Spitzer |
| 6,384,983 | B1 | 5/2002 | Yamazaki et al. |
| 6,388,683 | B1 | 5/2002 | Ishai et al. |
| 6,396,497 | B1 | 5/2002 | Reichlen |
| 6,396,639 | B1 | 5/2002 | Togino et al. |
| 6,407,724 | B2 | 6/2002 | Waldern et al. |
| 6,411,266 | B1 | 6/2002 | Maguire, Jr. |
| 6,417,970 | B1 | 7/2002 | Travers et al. |
| 6,421,031 | B1 | 7/2002 | Ronzani et al. |
| 6,421,453 | B1 | 7/2002 | Kanevsky et al. |
| 6,424,338 | B1 | 7/2002 | Anderson |
| 6,431,705 | B1 | 8/2002 | Linden |
| 6,445,364 | B2 | 9/2002 | Zwern |
| 6,445,507 | B2 | 9/2002 | Togino et al. |
| 6,445,679 | B1 | 9/2002 | Taniguchi et al. |
| 6,452,544 | B1 | 9/2002 | Hakala et al. |
| 6,456,438 | B1 | 9/2002 | Lee et al. |
| 6,474,809 | B2 | 11/2002 | Tanijiri et al. |
| 6,474,816 | B2 | 11/2002 | Butler et al. |
| 6,483,483 | B2 | 11/2002 | Kosugi et al. |
| 6,496,598 | B1 | 12/2002 | Harman |
| 6,501,590 | B2 | 12/2002 | Bass et al. |
| 6,502,000 | B1 | 12/2002 | Arnold et al. |
| 6,519,420 | B1 | 2/2003 | Yokomae et al. |
| 6,522,342 | B1 | 2/2003 | Gagnon et al. |
| 6,522,474 | B2 | 2/2003 | Cobb et al. |
| 6,522,794 | B1 | 2/2003 | Bischel et al. |
| 6,529,331 | B2 | 3/2003 | Massof et al. |
| 6,538,799 | B2 | 3/2003 | McClelland et al. |
| 6,554,444 | B2 | 4/2003 | Shimada et al. |
| 6,558,050 | B1 | 5/2003 | Ishibashi |
| 6,559,813 | B1 | 5/2003 | DeLuca et al. |

(56) References Cited

U.S. PATENT DOCUMENTS

| | | |
|---|---|---|
| 6,560,036 B2 | 5/2003 | Takahashi et al. |
| 6,597,320 B2 | 7/2003 | Maeda et al. |
| 6,603,608 B2 | 8/2003 | Togino |
| 6,611,385 B2 | 8/2003 | Song |
| 6,611,789 B1 | 8/2003 | Darley |
| 6,618,009 B2 | 9/2003 | Griffin et al. |
| 6,625,299 B1 | 9/2003 | Meisner et al. |
| 6,629,076 B1 | 9/2003 | Haken |
| 6,636,356 B2 | 10/2003 | Takeyama |
| 6,643,062 B1 | 11/2003 | Kamo |
| 6,646,812 B2 | 11/2003 | Togino |
| 6,650,448 B2 | 11/2003 | Nakamura et al. |
| 6,680,802 B1 | 1/2004 | Ichikawa et al. |
| 6,690,393 B2 | 2/2004 | Heron et al. |
| 6,690,516 B2 | 2/2004 | Aritake et al. |
| 6,693,749 B2 | 2/2004 | King et al. |
| 6,701,038 B2 | 3/2004 | Rensing et al. |
| 6,710,753 B2 | 3/2004 | Gillespie et al. |
| 6,710,902 B2 | 3/2004 | Takeyama |
| 6,711,414 B1 | 3/2004 | Lightman et al. |
| 6,714,665 B1 | 3/2004 | Hanna et al. |
| 6,724,354 B1 | 4/2004 | Spitzer et al. |
| 6,729,726 B2 | 5/2004 | Miller et al. |
| 6,732,080 B1 | 5/2004 | Blants |
| 6,735,328 B1 | 5/2004 | Helbing et al. |
| 6,738,040 B2 | 5/2004 | Jahn et al. |
| 6,752,498 B2 | 6/2004 | Covannon et al. |
| 6,753,828 B2 | 6/2004 | Tuceryan et al. |
| 6,757,068 B2 | 6/2004 | Foxlin |
| 6,757,107 B2 | 6/2004 | Togino |
| 6,760,169 B2 | 7/2004 | Takahashi et al. |
| 6,765,730 B2 | 7/2004 | Takahashi |
| 6,768,066 B2 | 7/2004 | Wehrenberg |
| 6,769,767 B2 | 8/2004 | Swab et al. |
| 6,771,294 B1 | 8/2004 | Pulli et al. |
| 6,772,143 B2 | 8/2004 | Hung |
| 6,801,347 B2 | 10/2004 | Nakamura et al. |
| 6,803,884 B1 | 10/2004 | Ohzawa et al. |
| 6,804,066 B1 | 10/2004 | Ha et al. |
| 6,816,141 B1 | 11/2004 | Fergason |
| 6,829,095 B2 | 12/2004 | Amitai |
| 6,829,391 B2 | 12/2004 | Comaniciu et al. |
| 6,879,443 B2 | 4/2005 | Spitzer et al. |
| 6,879,835 B2 | 4/2005 | Greene et al. |
| 6,882,479 B2 | 4/2005 | Song et al. |
| 6,888,502 B2 | 5/2005 | Beigel et al. |
| 6,898,550 B1 | 5/2005 | Blackadar et al. |
| 6,898,759 B1 | 5/2005 | Terada et al. |
| 6,899,539 B1 | 5/2005 | Stallman et al. |
| 6,900,778 B1 | 5/2005 | Yamamoto |
| 6,903,876 B2 | 6/2005 | Okada et al. |
| 6,920,283 B2 | 7/2005 | Goldstein |
| 6,937,400 B2 | 8/2005 | Olsson |
| 6,955,542 B2 | 10/2005 | Roncalez et al. |
| 6,966,668 B2 | 11/2005 | Cugini et al. |
| 6,967,569 B2 | 11/2005 | Weber et al. |
| 6,970,130 B1 | 11/2005 | Walters et al. |
| 6,975,389 B2 | 12/2005 | Takahashi |
| 6,983,370 B2 | 1/2006 | Eaton et al. |
| 6,987,620 B2 | 1/2006 | Nagaoka |
| 6,999,238 B2 | 2/2006 | Glebov et al. |
| 6,999,649 B1 | 2/2006 | Chen et al. |
| 7,002,551 B2 | 2/2006 | Azuma et al. |
| 7,003,562 B2 | 2/2006 | Mayer |
| 7,003,737 B2 | 2/2006 | Chiu et al. |
| 7,009,757 B2 | 3/2006 | Nishioka et al. |
| 7,012,593 B2 | 3/2006 | Yoon et al. |
| 7,019,798 B2 | 3/2006 | Endo et al. |
| 7,021,777 B2 | 4/2006 | Amitai |
| 7,024,046 B2 | 4/2006 | Dekel et al. |
| 7,050,078 B2 | 5/2006 | Dempski |
| 7,050,239 B2 | 5/2006 | Kamo |
| 7,059,728 B2 | 6/2006 | Alasaarela et al. |
| 7,059,781 B2 | 6/2006 | Suzuki et al. |
| 7,073,129 B1 | 7/2006 | Robarts et al. |
| 7,076,616 B2 | 7/2006 | Nguyen et al. |
| 7,088,516 B2 | 8/2006 | Yagi et al. |
| 7,098,896 B2 | 8/2006 | Kushler et al. |
| 7,103,906 B1 | 9/2006 | Katz et al. |
| 7,113,269 B2 | 9/2006 | Takahashi et al. |
| 7,113,349 B2 | 9/2006 | Takahashi |
| 7,116,412 B2 | 10/2006 | Takahashi et al. |
| 7,116,833 B2 | 10/2006 | Brower et al. |
| 7,119,965 B1 | 10/2006 | Rolland et al. |
| 7,123,215 B2 | 10/2006 | Nakada |
| 7,124,425 B1 | 10/2006 | Anderson, Jr. et al. |
| 7,126,558 B1 | 10/2006 | Dempski |
| 7,129,927 B2 | 10/2006 | Mattsson |
| 7,143,439 B2 | 11/2006 | Cooper et al. |
| 7,145,726 B2 | 12/2006 | Geist |
| 7,151,596 B2 | 12/2006 | Takahashi et al. |
| 7,154,395 B2 | 12/2006 | Raskar et al. |
| 7,158,096 B1 | 1/2007 | Spitzer |
| 7,162,054 B2 | 1/2007 | Meisner et al. |
| 7,162,392 B2 | 1/2007 | Vock et al. |
| 7,163,330 B2 | 1/2007 | Matsui et al. |
| 7,172,563 B2 | 2/2007 | Takiguchi et al. |
| 7,180,476 B1 | 2/2007 | Guell et al. |
| 7,191,233 B2 | 3/2007 | Miller |
| 7,192,136 B2 | 3/2007 | Howell et al. |
| 7,194,000 B2 | 3/2007 | Balachandran et al. |
| 7,196,315 B2 | 3/2007 | Takahashi |
| 7,199,720 B1 | 4/2007 | Shapiro |
| 7,206,134 B2 | 4/2007 | Weissman et al. |
| 7,206,804 B1 | 4/2007 | Deshpande et al. |
| 7,216,973 B2 | 5/2007 | Jannard et al. |
| 7,219,302 B1 | 5/2007 | O'Shaughnessy et al. |
| 7,221,505 B2 | 5/2007 | Goral |
| 7,242,527 B2 | 7/2007 | Spitzer et al. |
| 7,242,572 B2 | 7/2007 | Norton et al. |
| 7,245,440 B2 | 7/2007 | Peseux |
| 7,251,367 B2 | 7/2007 | Zhai |
| 7,254,287 B2 | 8/2007 | Ellwood, Jr. |
| 7,257,266 B2 | 8/2007 | Atsumi et al. |
| 7,259,898 B2 | 8/2007 | Khazova et al. |
| 7,262,919 B1 | 8/2007 | Yamazaki et al. |
| 7,265,896 B2 | 9/2007 | Miller |
| 7,272,646 B2 | 9/2007 | Cooper et al. |
| 7,278,734 B2 | 10/2007 | Jannard et al. |
| 7,284,267 B1 | 10/2007 | McArdle et al. |
| 7,292,243 B1 | 11/2007 | Burke |
| 7,301,529 B2 | 11/2007 | Marvit et al. |
| 7,301,648 B2 | 11/2007 | Foxlin |
| 7,313,246 B2 | 12/2007 | Miller et al. |
| 7,315,254 B2 | 1/2008 | Smith et al. |
| 7,319,437 B2 | 1/2008 | Yamamoto |
| 7,322,700 B2 | 1/2008 | Miyagaki et al. |
| 7,324,695 B2 | 1/2008 | Krishnan et al. |
| 7,327,852 B2 | 2/2008 | Ruwisch |
| 7,342,503 B1 | 3/2008 | Light et al. |
| 7,346,260 B2 | 3/2008 | Arakida et al. |
| D566,744 S | 4/2008 | Travers et al. |
| 7,353,034 B2 | 4/2008 | Haney |
| 7,353,996 B2 | 4/2008 | Goodman et al. |
| 7,355,795 B1 | 4/2008 | Yamazaki et al. |
| 7,362,738 B2 | 4/2008 | Taube et al. |
| 7,369,101 B2 | 5/2008 | Sauer et al. |
| 7,376,965 B2 | 5/2008 | Jemes et al. |
| 7,391,573 B2 | 6/2008 | Amitai |
| 7,394,346 B2 | 7/2008 | Bodin |
| 7,395,507 B2 | 7/2008 | Robarts et al. |
| 7,397,607 B2 | 7/2008 | Travers |
| 7,401,300 B2 | 7/2008 | Nurmi |
| 7,412,234 B2 | 8/2008 | Zellner |
| 7,415,522 B2 | 8/2008 | Kaluskar et al. |
| 7,420,282 B2 | 9/2008 | Iwane et al. |
| 7,423,802 B2 | 9/2008 | Miller |
| 7,431,463 B2 | 10/2008 | Beeson et al. |
| 7,453,439 B1 | 11/2008 | Kushler et al. |
| 7,453,451 B1 | 11/2008 | Maguire, Jr. |
| 7,457,040 B2 | 11/2008 | Amitai |
| 7,461,355 B2 | 12/2008 | SanGiovanni |
| 7,467,353 B2 | 12/2008 | Kurlander et al. |
| 7,478,066 B2 | 1/2009 | Remington et al. |

(56) References Cited

U.S. PATENT DOCUMENTS

| | | |
|---|---|---|
| 7,486,291 B2 | 2/2009 | Berson et al. |
| 7,486,930 B2 | 2/2009 | Bisdikian et al. |
| 7,487,461 B2 | 2/2009 | Zhai et al. |
| 7,500,747 B2 | 3/2009 | Howell et al. |
| 7,501,995 B2 | 3/2009 | Morita et al. |
| 7,502,168 B2 | 3/2009 | Akutsu et al. |
| 7,508,988 B2 | 3/2009 | Hara et al. |
| 7,513,670 B2 | 4/2009 | Yang et al. |
| 7,515,344 B2 | 4/2009 | Travers |
| 7,522,058 B1 | 4/2009 | Light et al. |
| 7,522,344 B1 | 4/2009 | Curatu et al. |
| 7,525,955 B2 | 4/2009 | Velez-Rivera et al. |
| 7,538,745 B2 | 5/2009 | Borovoy et al. |
| 7,542,012 B2 | 6/2009 | Kato et al. |
| 7,542,209 B2 | 6/2009 | McGuire, Jr. |
| 7,545,569 B2 | 6/2009 | Cassarly |
| 7,545,571 B2 | 6/2009 | Garoutte et al. |
| 7,548,256 B2 | 6/2009 | Pilu |
| 7,551,172 B2 | 6/2009 | Yaron et al. |
| 7,552,265 B2 | 6/2009 | Newman et al. |
| 7,561,966 B2 | 7/2009 | Nakamura et al. |
| 7,565,340 B2 | 7/2009 | Herlocker et al. |
| 7,568,672 B2 | 8/2009 | Ferrer et al. |
| 7,576,916 B2 | 8/2009 | Amitai |
| 7,577,326 B2 | 8/2009 | Amitai |
| 7,586,663 B1 | 9/2009 | Radmard et al. |
| 7,587,053 B1 | 9/2009 | Pereira |
| 7,589,269 B2 | 9/2009 | Lemons |
| 7,593,757 B2 | 9/2009 | Yamasaki |
| 7,595,933 B2 | 9/2009 | Tang |
| 7,602,950 B2 | 10/2009 | Goldstein et al. |
| 7,604,348 B2 | 10/2009 | Jacobs et al. |
| 7,613,826 B2 | 11/2009 | Guichard et al. |
| 7,619,626 B2 | 11/2009 | Bernier |
| 7,623,987 B2 | 11/2009 | Vock et al. |
| 7,624,918 B2 | 12/2009 | Sweeney et al. |
| 7,631,968 B1 | 12/2009 | Dobson et al. |
| 7,639,218 B2 | 12/2009 | Lee et al. |
| 7,643,214 B2 | 1/2010 | Amitai |
| 7,645,041 B2 | 1/2010 | Frare |
| 7,648,236 B1 | 1/2010 | Dobson |
| 7,648,463 B1 | 1/2010 | Elhag et al. |
| 7,651,033 B2 | 1/2010 | Asakura et al. |
| 7,651,594 B2 | 1/2010 | Komada et al. |
| 7,663,805 B2 | 2/2010 | Zaloum et al. |
| 7,667,657 B2 | 2/2010 | Koshiji |
| 7,672,055 B2 | 3/2010 | Amitai |
| 7,674,028 B2 | 3/2010 | Cassarly et al. |
| 7,675,683 B2 | 3/2010 | Dobson et al. |
| 7,676,583 B2 | 3/2010 | Eaton et al. |
| 7,677,723 B2 | 3/2010 | Howell et al. |
| 7,680,667 B2 | 3/2010 | Sonoura et al. |
| 7,685,433 B2 | 3/2010 | Mantyjarvi et al. |
| 7,698,513 B2 | 4/2010 | Sechrest et al. |
| 7,699,473 B2 | 4/2010 | Mukawa et al. |
| 7,706,616 B2 | 4/2010 | Kristensson et al. |
| 7,711,961 B2 | 5/2010 | Fujinuma et al. |
| 7,715,873 B1 | 5/2010 | Biere et al. |
| 7,716,281 B2 | 5/2010 | Lin et al. |
| 7,719,521 B2 | 5/2010 | Yang et al. |
| 7,719,769 B2 | 5/2010 | Sugihara et al. |
| 7,724,441 B2 | 5/2010 | Amitai |
| 7,724,442 B2 | 5/2010 | Amitai |
| 7,724,443 B2 | 5/2010 | Amitai |
| 7,729,325 B2 | 6/2010 | Gopalakrishnan et al. |
| 7,732,694 B2 | 6/2010 | Rosenberg |
| 7,734,119 B2 | 6/2010 | Cheryauka et al. |
| 7,735,018 B2 | 6/2010 | Bakhash |
| 7,738,179 B2 | 6/2010 | Nishi |
| 7,751,122 B2 | 7/2010 | Amitai |
| 7,755,566 B2 | 7/2010 | Hoisko |
| 7,755,667 B2 | 7/2010 | Rabbani et al. |
| 7,769,412 B1 | 8/2010 | Gailloux |
| 7,769,794 B2 | 8/2010 | Moore et al. |
| 7,787,992 B2 | 8/2010 | Pretlove et al. |
| 7,791,809 B2 | 9/2010 | Filipovich et al. |
| 7,797,338 B2 | 9/2010 | Feng et al. |
| 7,805,003 B1 | 9/2010 | Cohen et al. |
| 7,809,842 B2 | 10/2010 | Moran et al. |
| 7,810,750 B2 | 10/2010 | Abreu |
| 7,820,081 B2 | 10/2010 | Chiu et al. |
| 7,822,804 B2 | 10/2010 | Lee et al. |
| 7,826,531 B2 | 11/2010 | Wang et al. |
| 7,827,495 B2 | 11/2010 | Bells et al. |
| 7,830,319 B2 | 11/2010 | Cohen et al. |
| 7,839,926 B1 | 11/2010 | Metzger et al. |
| 7,840,979 B2 | 11/2010 | Poling, Jr. et al. |
| 7,843,403 B2 | 11/2010 | Spitzer |
| 7,843,425 B2 | 11/2010 | Lu et al. |
| 7,850,306 B2 | 12/2010 | Uusitalo et al. |
| 7,851,758 B1 | 12/2010 | Scanlon et al. |
| 7,855,743 B2 | 12/2010 | Sako et al. |
| 7,862,522 B1 | 1/2011 | Barclay et al. |
| 7,864,440 B2 | 1/2011 | Berge |
| 7,871,323 B2 | 1/2011 | Walker et al. |
| 7,872,636 B1 | 1/2011 | Gopi et al. |
| 7,876,489 B2 | 1/2011 | Gandhi et al. |
| 7,876,914 B2 | 1/2011 | Grosvenor et al. |
| 7,877,121 B2 | 1/2011 | Seshadri et al. |
| 7,877,707 B2 | 1/2011 | Westerman et al. |
| 7,878,408 B2 | 2/2011 | Lapstun et al. |
| 7,889,290 B2 | 2/2011 | Mills |
| 7,894,440 B2 | 2/2011 | Xu et al. |
| 7,895,261 B2 | 2/2011 | Jones et al. |
| 7,899,915 B2 | 3/2011 | Reisman |
| 7,900,068 B2 | 3/2011 | Weststrate et al. |
| 7,907,122 B2 | 3/2011 | LaPointe et al. |
| 7,907,166 B2 | 3/2011 | Lamprecht et al. |
| 7,920,102 B2 | 4/2011 | Breed |
| 7,924,655 B2 | 4/2011 | Liu et al. |
| RE42,336 E | 5/2011 | Fateh et al. |
| 7,948,451 B2 | 5/2011 | Gustafsson et al. |
| 7,956,822 B2 | 6/2011 | Nakabayashi et al. |
| 7,958,457 B1 | 6/2011 | Brandenberg et al. |
| 7,991,294 B2 | 8/2011 | Dreischer et al. |
| 8,009,141 B1 | 8/2011 | Chi et al. |
| 8,049,680 B2 | 11/2011 | Spruck et al. |
| 8,060,533 B1 | 11/2011 | Wheeler et al. |
| 8,094,091 B2 | 1/2012 | Noma |
| 8,130,260 B2 | 3/2012 | Krill et al. |
| 8,135,815 B2 | 3/2012 | Mayer |
| 8,139,943 B2 | 3/2012 | Asukai et al. |
| 8,140,970 B2 | 3/2012 | Brown et al. |
| 8,160,311 B1 | 4/2012 | Schaefer |
| 8,175,297 B1 | 5/2012 | Ho et al. |
| 8,176,437 B1 | 5/2012 | Taubman |
| 8,179,604 B1 | 5/2012 | Prada Gomez et al. |
| 8,183,997 B1 | 5/2012 | Wong et al. |
| 8,184,067 B1 | 5/2012 | Braun et al. |
| 8,184,068 B1 | 5/2012 | Rhodes et al. |
| 8,184,069 B1 | 5/2012 | Rhodes |
| 8,184,070 B1 | 5/2012 | Taubman |
| 8,184,983 B1 | 5/2012 | Ho et al. |
| 8,185,845 B2 | 5/2012 | Bjorklund et al. |
| 8,188,880 B1 | 5/2012 | Chi et al. |
| 8,189,263 B1 | 5/2012 | Wang et al. |
| 8,190,749 B1 | 5/2012 | Chi et al. |
| 8,203,502 B1 | 6/2012 | Chi et al. |
| 8,212,859 B2 | 7/2012 | Tang et al. |
| 8,217,856 B1 | 7/2012 | Petrou |
| 8,228,315 B1 | 7/2012 | Starner et al. |
| 8,392,353 B2 | 3/2013 | Cho et al. |
| 8,448,170 B2 | 5/2013 | Wipfel et al. |
| 8,456,485 B2 | 6/2013 | Tsujimoto |
| 8,467,133 B2* | 6/2013 | Miller ........................ 359/630 |
| 8,472,120 B2 | 6/2013 | Border et al. |
| 8,477,425 B2 | 7/2013 | Border et al. |
| 8,482,859 B2 | 7/2013 | Border et al. |
| 8,487,786 B1 | 7/2013 | Hussey et al. |
| 8,488,246 B2 | 7/2013 | Border et al. |
| 8,533,485 B1 | 9/2013 | Bansal et al. |
| 8,582,206 B2 | 11/2013 | Travis |
| 8,605,008 B1 | 12/2013 | Prest et al. |
| 8,630,947 B1 | 1/2014 | Freund |

(56) References Cited

U.S. PATENT DOCUMENTS

| | | |
|---|---|---|
| 8,711,487 B2 | 4/2014 | Takeda et al. |
| 8,854,735 B2 | 10/2014 | Totani et al. |
| 2001/0010598 A1 | 8/2001 | Aritake et al. |
| 2001/0021012 A1 | 9/2001 | Shirai et al. |
| 2001/0021058 A1 | 9/2001 | McClelland et al. |
| 2001/0022682 A1 | 9/2001 | McClelland et al. |
| 2001/0035845 A1 | 11/2001 | Zwern |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2002/0007306 A1 | 1/2002 | Granger et al. |
| 2002/0021498 A1 | 2/2002 | Ohtaka et al. |
| 2002/0042292 A1 | 4/2002 | Hama |
| 2002/0044152 A1 | 4/2002 | Abbott, III et al. |
| 2002/0052684 A1 | 5/2002 | Bide |
| 2002/0054174 A1 | 5/2002 | Abbott et al. |
| 2002/0057280 A1 | 5/2002 | Anabuki et al. |
| 2002/0069072 A1 | 6/2002 | Friedrich et al. |
| 2002/0070611 A1 | 6/2002 | Cline et al. |
| 2002/0101546 A1 | 8/2002 | Sharp et al. |
| 2002/0105482 A1 | 8/2002 | Lemelson et al. |
| 2002/0106115 A1 | 8/2002 | Rajbenbach et al. |
| 2002/0122015 A1 | 9/2002 | Song et al. |
| 2002/0131121 A1 | 9/2002 | Jeganathan et al. |
| 2002/0149467 A1 | 10/2002 | Calvesio et al. |
| 2002/0149545 A1 | 10/2002 | Hanayama et al. |
| 2002/0158813 A1 | 10/2002 | Kiyokawa et al. |
| 2002/0158815 A1 | 10/2002 | Zwern |
| 2002/0167536 A1 | 11/2002 | Valdes et al. |
| 2002/0178246 A1 | 11/2002 | Mayer |
| 2002/0180727 A1 | 12/2002 | Guckenberger et al. |
| 2002/0184525 A1 | 12/2002 | Cheng |
| 2002/0186348 A1 | 12/2002 | Covannon et al. |
| 2002/0196554 A1 | 12/2002 | Cobb et al. |
| 2003/0013483 A1 | 1/2003 | Ausems et al. |
| 2003/0020707 A1 | 1/2003 | Kangas et al. |
| 2003/0026461 A1 | 2/2003 | Arthur Hunter |
| 2003/0030597 A1 | 2/2003 | Geist |
| 2003/0030912 A1 | 2/2003 | Gleckman et al. |
| 2003/0032436 A1 | 2/2003 | Mikuni |
| 2003/0038922 A1 | 2/2003 | Ferrell |
| 2003/0046401 A1 | 3/2003 | Abbott et al. |
| 2003/0058100 A1 | 3/2003 | Jumpertz |
| 2003/0063383 A1 | 4/2003 | Costales |
| 2003/0076300 A1 | 4/2003 | Lauper et al. |
| 2003/0086054 A1 | 5/2003 | Waters |
| 2003/0090439 A1 | 5/2003 | Spitzer et al. |
| 2003/0093187 A1 | 5/2003 | Walker |
| 2003/0184864 A1 | 10/2003 | Bruzzone et al. |
| 2003/0210911 A1 | 11/2003 | Takahashi et al. |
| 2003/0214481 A1 | 11/2003 | Xiong |
| 2003/0227470 A1 | 12/2003 | Genc et al. |
| 2003/0229808 A1 | 12/2003 | Heintz et al. |
| 2004/0008157 A1 | 1/2004 | Brubaker et al. |
| 2004/0027475 A1 | 2/2004 | Kamo |
| 2004/0030882 A1 | 2/2004 | Forman |
| 2004/0056870 A1 | 3/2004 | Shimoyama et al. |
| 2004/0070611 A1 | 4/2004 | Tanaka et al. |
| 2004/0083295 A1 | 4/2004 | Amara et al. |
| 2004/0101178 A1 | 5/2004 | Fedorovskaya et al. |
| 2004/0105573 A1 | 6/2004 | Neumann et al. |
| 2004/0111643 A1 | 6/2004 | Farmer |
| 2004/0120583 A1 | 6/2004 | Zhai |
| 2004/0150884 A1 | 8/2004 | Domjan et al. |
| 2004/0157648 A1 | 8/2004 | Lightman |
| 2004/0169663 A1 | 9/2004 | Bernier |
| 2004/0174610 A1 | 9/2004 | Aizenberg et al. |
| 2004/0176143 A1 | 9/2004 | Willins et al. |
| 2004/0183749 A1 | 9/2004 | Vertegaal |
| 2004/0193413 A1 | 9/2004 | Wilson et al. |
| 2004/0204240 A1 | 10/2004 | Barney |
| 2004/0233551 A1 | 11/2004 | Takahashi et al. |
| 2004/0257663 A1 | 12/2004 | Edelmann |
| 2004/0263613 A1 | 12/2004 | Morita |
| 2005/0007672 A1 | 1/2005 | Wu |
| 2005/0013021 A1 | 1/2005 | Takahashi et al. |
| 2005/0021679 A1 | 1/2005 | Lightman et al. |
| 2005/0046954 A1 | 3/2005 | Achtner |
| 2005/0048918 A1 | 3/2005 | Frost et al. |
| 2005/0052684 A1 | 3/2005 | Ferlitsch |
| 2005/0061890 A1 | 3/2005 | Hinckley |
| 2005/0068239 A1 | 3/2005 | Fischer et al. |
| 2005/0071158 A1 | 3/2005 | Byford |
| 2005/0086610 A1 | 4/2005 | Mackinlay et al. |
| 2005/0091184 A1 | 4/2005 | Seshadri et al. |
| 2005/0094019 A1 | 5/2005 | Grosvenor et al. |
| 2005/0104089 A1 | 5/2005 | Engelmann et al. |
| 2005/0174470 A1 | 8/2005 | Yamasaki |
| 2005/0174651 A1 | 8/2005 | Spitzer et al. |
| 2005/0180021 A1 | 8/2005 | Travers |
| 2005/0190258 A1 | 9/2005 | Siegel et al. |
| 2005/0190973 A1 | 9/2005 | Kristensson et al. |
| 2005/0200937 A1 | 9/2005 | Weidner |
| 2005/0201704 A1 | 9/2005 | Ellwood, Jr. |
| 2005/0201705 A1 | 9/2005 | Ellwood, Jr. |
| 2005/0201715 A1 | 9/2005 | Ellwood, Jr. |
| 2005/0206583 A1 | 9/2005 | Lemelson et al. |
| 2005/0225868 A1 | 10/2005 | Nelson et al. |
| 2005/0230596 A1 | 10/2005 | Howell et al. |
| 2005/0248852 A1 | 11/2005 | Yamasaki |
| 2005/0250552 A1 | 11/2005 | Eagle et al. |
| 2005/0257244 A1 | 11/2005 | Joly et al. |
| 2005/0264502 A1 | 12/2005 | Sprague et al. |
| 2005/0264527 A1 | 12/2005 | Lin |
| 2005/0264752 A1 | 12/2005 | Howell et al. |
| 2005/0289538 A1 | 12/2005 | Black-Ziegelbein et al. |
| 2005/0289590 A1 | 12/2005 | Cheok et al. |
| 2006/0007056 A1 | 1/2006 | Ou |
| 2006/0007223 A1 | 1/2006 | Parker |
| 2006/0007671 A1 | 1/2006 | Lavoie |
| 2006/0010492 A9 | 1/2006 | Heintz et al. |
| 2006/0012566 A1 | 1/2006 | Siddeeq |
| 2006/0013440 A1 | 1/2006 | Cohen et al. |
| 2006/0028400 A1 | 2/2006 | Lapstun et al. |
| 2006/0028543 A1 | 2/2006 | Sohn et al. |
| 2006/0033992 A1 | 2/2006 | Solomon |
| 2006/0036585 A1 | 2/2006 | King et al. |
| 2006/0038880 A1 | 2/2006 | Starkweather et al. |
| 2006/0038881 A1 | 2/2006 | Starkweather et al. |
| 2006/0041758 A1 | 2/2006 | Dunn et al. |
| 2006/0052144 A1 | 3/2006 | Seil et al. |
| 2006/0061544 A1 | 3/2006 | Min et al. |
| 2006/0061555 A1 | 3/2006 | Mullen |
| 2006/0097986 A1 | 5/2006 | Mizuno |
| 2006/0098293 A1 | 5/2006 | Garoutte et al. |
| 2006/0110090 A1 | 5/2006 | Ellwood, Jr. |
| 2006/0110900 A1 | 5/2006 | Youn et al. |
| 2006/0115130 A1 | 6/2006 | Kozlay |
| 2006/0119539 A1 | 6/2006 | Kato et al. |
| 2006/0119540 A1 | 6/2006 | Dobson et al. |
| 2006/0123463 A1 | 6/2006 | Yeap et al. |
| 2006/0129670 A1 | 6/2006 | Mayer |
| 2006/0129672 A1 | 6/2006 | Mayer |
| 2006/0132382 A1 | 6/2006 | Jannard |
| 2006/0146767 A1 | 7/2006 | Moganti |
| 2006/0152434 A1 | 7/2006 | Sauer et al. |
| 2006/0152782 A1 | 7/2006 | Noda et al. |
| 2006/0158329 A1 | 7/2006 | Burkley et al. |
| 2006/0177103 A1 | 8/2006 | Hildreth |
| 2006/0181537 A1 | 8/2006 | Vasan et al. |
| 2006/0182287 A1 | 8/2006 | Schulein et al. |
| 2006/0192306 A1 | 8/2006 | Giller et al. |
| 2006/0192307 A1 | 8/2006 | Giller et al. |
| 2006/0221098 A1 | 10/2006 | Matsui et al. |
| 2006/0227151 A1 | 10/2006 | Bannai |
| 2006/0232665 A1 | 10/2006 | Schowengerdt et al. |
| 2006/0238878 A1 | 10/2006 | Miyake et al. |
| 2006/0239471 A1 | 10/2006 | Mao et al. |
| 2006/0241792 A1 | 10/2006 | Pretlove et al. |
| 2006/0241864 A1 | 10/2006 | Rosenberg |
| 2006/0244820 A1 | 11/2006 | Morita et al. |
| 2006/0250574 A1 | 11/2006 | Grand et al. |
| 2006/0253793 A1 | 11/2006 | Zhai et al. |

(56) References Cited

U.S. PATENT DOCUMENTS

| | | |
|---|---|---|
| 2006/0259511 A1 | 11/2006 | Boerries et al. |
| 2006/0279662 A1 | 12/2006 | Kapellner et al. |
| 2006/0284791 A1 | 12/2006 | Chen et al. |
| 2006/0284792 A1 | 12/2006 | Foxlin |
| 2006/0288842 A1 | 12/2006 | Sitrick et al. |
| 2007/0003915 A1 | 1/2007 | Templeman |
| 2007/0011723 A1 | 1/2007 | Chao |
| 2007/0018975 A1 | 1/2007 | Chuanggui et al. |
| 2007/0030211 A1 | 2/2007 | McGlone et al. |
| 2007/0030442 A1 | 2/2007 | Howell et al. |
| 2007/0035562 A1 | 2/2007 | Azuma et al. |
| 2007/0035563 A1 | 2/2007 | Biocca et al. |
| 2007/0037520 A1 | 2/2007 | Warren |
| 2007/0047040 A1 | 3/2007 | Ha |
| 2007/0047091 A1 | 3/2007 | Spitzer et al. |
| 2007/0052672 A1 | 3/2007 | Ritter et al. |
| 2007/0053513 A1 | 3/2007 | Hoffberg |
| 2007/0058261 A1 | 3/2007 | Sugihara et al. |
| 2007/0061870 A1 | 3/2007 | Ting et al. |
| 2007/0064310 A1 | 3/2007 | Mukawa et al. |
| 2007/0070069 A1 | 3/2007 | Samarasekera et al. |
| 2007/0070859 A1 | 3/2007 | Hirayama |
| 2007/0078552 A1 | 4/2007 | Rosenberg |
| 2007/0094597 A1 | 4/2007 | Rostom |
| 2007/0103388 A1 | 5/2007 | Spitzer |
| 2007/0117576 A1 | 5/2007 | Huston |
| 2007/0124721 A1 | 5/2007 | Cowing et al. |
| 2007/0136064 A1 | 6/2007 | Carroll |
| 2007/0139769 A1 | 6/2007 | DeCusatis et al. |
| 2007/0157106 A1 | 7/2007 | Bishop |
| 2007/0157286 A1 | 7/2007 | Singh et al. |
| 2007/0176851 A1 | 8/2007 | Willey et al. |
| 2007/0177275 A1* | 8/2007 | McGuire ............ 359/630 |
| 2007/0180979 A1 | 8/2007 | Rosenberg |
| 2007/0184422 A1 | 8/2007 | Takahashi |
| 2007/0188837 A1 | 8/2007 | Shimizu et al. |
| 2007/0195012 A1 | 8/2007 | Ichikawa et al. |
| 2007/0220108 A1 | 9/2007 | Whitaker |
| 2007/0220441 A1 | 9/2007 | Melton et al. |
| 2007/0237402 A1 | 10/2007 | Dekel et al. |
| 2007/0237491 A1 | 10/2007 | Kraft |
| 2007/0245048 A1 | 10/2007 | Mesut et al. |
| 2007/0262958 A1 | 11/2007 | Cai et al. |
| 2007/0263137 A1 | 11/2007 | Shigeta et al. |
| 2007/0273557 A1 | 11/2007 | Baillot |
| 2007/0273610 A1 | 11/2007 | Baillot |
| 2007/0273611 A1 | 11/2007 | Torch |
| 2007/0273679 A1 | 11/2007 | Barton |
| 2007/0273796 A1 | 11/2007 | Silverstein et al. |
| 2007/0273983 A1 | 11/2007 | Hebert |
| 2007/0285346 A1 | 12/2007 | Li |
| 2007/0285621 A1 | 12/2007 | Kimura |
| 2007/0300185 A1 | 12/2007 | Macbeth et al. |
| 2008/0002859 A1 | 1/2008 | Tsan |
| 2008/0004952 A1 | 1/2008 | Koli |
| 2008/0010534 A1 | 1/2008 | Athale et al. |
| 2008/0013185 A1 | 1/2008 | Garoutte et al. |
| 2008/0024523 A1 | 1/2008 | Tomite et al. |
| 2008/0026838 A1 | 1/2008 | Dunstan et al. |
| 2008/0036653 A1 | 2/2008 | Huston |
| 2008/0037880 A1 | 2/2008 | Lai |
| 2008/0048930 A1 | 2/2008 | Breed |
| 2008/0048932 A1 | 2/2008 | Yanagisawa |
| 2008/0059578 A1 | 3/2008 | Albertson et al. |
| 2008/0062069 A1 | 3/2008 | Sinclair et al. |
| 2008/0068559 A1 | 3/2008 | Howell et al. |
| 2008/0071559 A1 | 3/2008 | Arrasvuori |
| 2008/0089556 A1 | 4/2008 | Salgian et al. |
| 2008/0089587 A1 | 4/2008 | Kim et al. |
| 2008/0106775 A1 | 5/2008 | Amitai et al. |
| 2008/0111832 A1 | 5/2008 | Emam et al. |
| 2008/0115069 A1 | 5/2008 | Veselova |
| 2008/0117341 A1 | 5/2008 | McGrew |
| 2008/0118897 A1 | 5/2008 | Perales |
| 2008/0122736 A1 | 5/2008 | Ronzani et al. |
| 2008/0122737 A1 | 5/2008 | Lea et al. |
| 2008/0141149 A1 | 6/2008 | Yee et al. |
| 2008/0144264 A1 | 6/2008 | Cosgrove |
| 2008/0151379 A1 | 6/2008 | Amitai |
| 2008/0157946 A1 | 7/2008 | Eberl et al. |
| 2008/0168188 A1 | 7/2008 | Yue et al. |
| 2008/0186254 A1 | 8/2008 | Simmons |
| 2008/0186604 A1 | 8/2008 | Amitai |
| 2008/0198471 A1 | 8/2008 | Amitai |
| 2008/0199080 A1 | 8/2008 | Subbiah et al. |
| 2008/0208396 A1 | 8/2008 | Cairola et al. |
| 2008/0208466 A1 | 8/2008 | Iwatani |
| 2008/0216171 A1 | 9/2008 | Sano et al. |
| 2008/0218434 A1 | 9/2008 | Kelly et al. |
| 2008/0219025 A1 | 9/2008 | Spitzer et al. |
| 2008/0219522 A1 | 9/2008 | Hook |
| 2008/0239236 A1 | 10/2008 | Blum et al. |
| 2008/0239523 A1 | 10/2008 | Beck et al. |
| 2008/0246694 A1 | 10/2008 | Fischer |
| 2008/0247567 A1 | 10/2008 | Kjolerbakken et al. |
| 2008/0247722 A1 | 10/2008 | Van Gorkom et al. |
| 2008/0249936 A1 | 10/2008 | Miller et al. |
| 2008/0259022 A1 | 10/2008 | Mansfield et al. |
| 2008/0262910 A1 | 10/2008 | Altberg et al. |
| 2008/0266323 A1 | 10/2008 | Biocca et al. |
| 2008/0268876 A1 | 10/2008 | Gelfand et al. |
| 2008/0275764 A1 | 11/2008 | Wilson et al. |
| 2008/0278812 A1 | 11/2008 | Amitai |
| 2008/0278821 A1 | 11/2008 | Rieger |
| 2008/0281940 A1 | 11/2008 | Coxhill |
| 2008/0285140 A1 | 11/2008 | Amitai |
| 2009/0003662 A1 | 1/2009 | Joseph et al. |
| 2009/0013052 A1 | 1/2009 | Robarts et al. |
| 2009/0015902 A1 | 1/2009 | Powers et al. |
| 2009/0017916 A1 | 1/2009 | Blanchard, III et al. |
| 2009/0040308 A1 | 2/2009 | Temovskiy |
| 2009/0051879 A1 | 2/2009 | Vitale et al. |
| 2009/0052030 A1 | 2/2009 | Kaida et al. |
| 2009/0052046 A1 | 2/2009 | Amitai |
| 2009/0052047 A1 | 2/2009 | Amitai |
| 2009/0055739 A1 | 2/2009 | Murillo et al. |
| 2009/0061901 A1 | 3/2009 | Arrasvuori et al. |
| 2009/0066782 A1 | 3/2009 | Choi et al. |
| 2009/0076894 A1 | 3/2009 | Bates et al. |
| 2009/0081959 A1 | 3/2009 | Gyorfi et al. |
| 2009/0088204 A1 | 4/2009 | Culbert et al. |
| 2009/0096714 A1 | 4/2009 | Yamada |
| 2009/0096746 A1 | 4/2009 | Kruse et al. |
| 2009/0097127 A1 | 4/2009 | Amitai |
| 2009/0111526 A1 | 4/2009 | Masri |
| 2009/0112713 A1 | 4/2009 | Jung et al. |
| 2009/0122414 A1 | 5/2009 | Amitai |
| 2009/0125510 A1 | 5/2009 | Graham et al. |
| 2009/0125849 A1 | 5/2009 | Bouvin et al. |
| 2009/0128449 A1 | 5/2009 | Brown et al. |
| 2009/0137055 A1 | 5/2009 | Bognar |
| 2009/0141324 A1 | 6/2009 | Mukawa |
| 2009/0153468 A1 | 6/2009 | Ong et al. |
| 2009/0161383 A1 | 6/2009 | Meir et al. |
| 2009/0164212 A1 | 6/2009 | Chan et al. |
| 2009/0170532 A1 | 7/2009 | Lee et al. |
| 2009/0174946 A1 | 7/2009 | Raviv et al. |
| 2009/0177663 A1 | 7/2009 | Hulaj et al. |
| 2009/0181650 A1 | 7/2009 | Dicke |
| 2009/0189974 A1 | 7/2009 | Deering |
| 2009/0204928 A1 | 8/2009 | Kallio et al. |
| 2009/0213321 A1 | 8/2009 | Galstian et al. |
| 2009/0219283 A1 | 9/2009 | Hendrickson et al. |
| 2009/0228552 A1 | 9/2009 | Abbott et al. |
| 2009/0231116 A1 | 9/2009 | Takahashi et al. |
| 2009/0232351 A1 | 9/2009 | Kagitani et al. |
| 2009/0234614 A1 | 9/2009 | Kahn et al. |
| 2009/0234732 A1 | 9/2009 | Zorman et al. |
| 2009/0237423 A1 | 9/2009 | Shih et al. |
| 2009/0237804 A1 | 9/2009 | Amitai et al. |
| 2009/0239591 A1 | 9/2009 | Alameh et al. |
| 2009/0241171 A1 | 9/2009 | Sunwoo et al. |
| 2009/0244048 A1 | 10/2009 | Yamanaka |
| 2009/0261490 A1 | 10/2009 | Martineau et al. |

(56) References Cited

U.S. PATENT DOCUMENTS

| | | |
|---|---|---|
| 2009/0278766 A1 | 11/2009 | Sako et al. |
| 2009/0282030 A1 | 11/2009 | Abbott et al. |
| 2009/0289956 A1 | 11/2009 | Douris et al. |
| 2009/0290450 A1 | 11/2009 | Rioux |
| 2009/0293000 A1 | 11/2009 | Lepeska |
| 2009/0300535 A1 | 12/2009 | Skourup et al. |
| 2009/0300657 A1 | 12/2009 | Kumari |
| 2009/0309826 A1 | 12/2009 | Jung et al. |
| 2009/0316097 A1 | 12/2009 | Presniakov et al. |
| 2009/0319178 A1 | 12/2009 | Khosravy et al. |
| 2009/0319181 A1 | 12/2009 | Khosravy et al. |
| 2009/0319672 A1 | 12/2009 | Reisman |
| 2009/0319902 A1 | 12/2009 | Kneller et al. |
| 2009/0320073 A1 | 12/2009 | Reisman |
| 2010/0001928 A1 | 1/2010 | Nutaro |
| 2010/0002154 A1 | 1/2010 | Hua |
| 2010/0005293 A1 | 1/2010 | Errico |
| 2010/0007582 A1 | 1/2010 | Zalewski |
| 2010/0007807 A1 | 1/2010 | Galstian et al. |
| 2010/0013739 A1 | 1/2010 | Sako et al. |
| 2010/0016757 A1 | 1/2010 | Greenburg et al. |
| 2010/0017872 A1 | 1/2010 | Goertz et al. |
| 2010/0023506 A1 | 1/2010 | Sahni et al. |
| 2010/0023878 A1 | 1/2010 | Douris et al. |
| 2010/0030578 A1 | 2/2010 | Siddique et al. |
| 2010/0039353 A1 | 2/2010 | Cernasov |
| 2010/0040151 A1 | 2/2010 | Garrett |
| 2010/0045701 A1 | 2/2010 | Scott et al. |
| 2010/0046070 A1 | 2/2010 | Mukawa |
| 2010/0046219 A1 | 2/2010 | Pijlman et al. |
| 2010/0048256 A1 | 2/2010 | Huppi et al. |
| 2010/0048302 A1 | 2/2010 | Lutnick et al. |
| 2010/0050221 A1 | 2/2010 | McCutchen et al. |
| 2010/0053753 A1* | 3/2010 | Nestorovic et al. ........... 359/493 |
| 2010/0058435 A1 | 3/2010 | Buss et al. |
| 2010/0060552 A1 | 3/2010 | Watanabe et al. |
| 2010/0063794 A1 | 3/2010 | Hernandez-Rebollar |
| 2010/0064228 A1 | 3/2010 | Tsern |
| 2010/0066676 A1 | 3/2010 | Kramer et al. |
| 2010/0066821 A1 | 3/2010 | Rosener et al. |
| 2010/0069035 A1 | 3/2010 | Johnson |
| 2010/0079356 A1 | 4/2010 | Hoellwarth |
| 2010/0099464 A1 | 4/2010 | Kim |
| 2010/0103075 A1 | 4/2010 | Kalaboukis et al. |
| 2010/0103078 A1 | 4/2010 | Mukawa et al. |
| 2010/0103196 A1 | 4/2010 | Kumar et al. |
| 2010/0110368 A1 | 5/2010 | Chaum |
| 2010/0119072 A1 | 5/2010 | Ojanpera |
| 2010/0120585 A1 | 5/2010 | Quy |
| 2010/0125812 A1 | 5/2010 | Hartman et al. |
| 2010/0131308 A1 | 5/2010 | Collopy et al. |
| 2010/0138481 A1 | 6/2010 | Behrens |
| 2010/0142189 A1 | 6/2010 | Hong et al. |
| 2010/0144268 A1 | 6/2010 | Haberli |
| 2010/0146441 A1 | 6/2010 | Halme |
| 2010/0149073 A1 | 6/2010 | Chaum et al. |
| 2010/0157433 A1 | 6/2010 | Mukawa et al. |
| 2010/0164990 A1 | 7/2010 | Van Doorn |
| 2010/0165092 A1 | 7/2010 | Yamaguchi |
| 2010/0171680 A1 | 7/2010 | Lapidot et al. |
| 2010/0171700 A1 | 7/2010 | Sharan et al. |
| 2010/0174801 A1 | 7/2010 | Tabaaloute |
| 2010/0177114 A1 | 7/2010 | Nakashima |
| 2010/0177386 A1 | 7/2010 | Berge et al. |
| 2010/0182340 A1 | 7/2010 | Bachelder et al. |
| 2010/0201716 A1 | 8/2010 | Tanizoe et al. |
| 2010/0211431 A1 | 8/2010 | Lutnick et al. |
| 2010/0217099 A1 | 8/2010 | LeBoeuf et al. |
| 2010/0217657 A1 | 8/2010 | Gazdzinski |
| 2010/0220037 A1 | 9/2010 | Sako et al. |
| 2010/0226535 A1 | 9/2010 | Kimchi et al. |
| 2010/0254543 A1 | 10/2010 | Kjolerbakken |
| 2010/0277692 A1 | 11/2010 | Mukai et al. |
| 2010/0278480 A1 | 11/2010 | Vasylyev |
| 2010/0295769 A1 | 11/2010 | Lundstrom |
| 2010/0295987 A1 | 11/2010 | Berge |
| 2010/0304787 A1 | 12/2010 | Lee et al. |
| 2010/0313225 A1 | 12/2010 | Cholas et al. |
| 2010/0315329 A1 | 12/2010 | Previc et al. |
| 2010/0318500 A1 | 12/2010 | Murphy et al. |
| 2010/0319004 A1 | 12/2010 | Hudson et al. |
| 2010/0321409 A1 | 12/2010 | Komori et al. |
| 2010/0328204 A1 | 12/2010 | Edwards et al. |
| 2010/0328492 A1 | 12/2010 | Fedorovskaya et al. |
| 2010/0332640 A1 | 12/2010 | Goodrow et al. |
| 2010/0332818 A1 | 12/2010 | Prahlad et al. |
| 2011/0001695 A1 | 1/2011 | Suzuki et al. |
| 2011/0001699 A1 | 1/2011 | Jacobsen et al. |
| 2011/0002469 A1 | 1/2011 | Ojala |
| 2011/0007035 A1 | 1/2011 | Shai |
| 2011/0007081 A1 | 1/2011 | Gordon |
| 2011/0007277 A1 | 1/2011 | Solomon |
| 2011/0009241 A1 | 1/2011 | Lane et al. |
| 2011/0010672 A1 | 1/2011 | Hope |
| 2011/0012896 A1 | 1/2011 | Ji |
| 2011/0018903 A1 | 1/2011 | Lapstun et al. |
| 2011/0022357 A1 | 1/2011 | Vock et al. |
| 2011/0032187 A1 | 2/2011 | Kramer et al. |
| 2011/0035684 A1 | 2/2011 | Lewis et al. |
| 2011/0037606 A1 | 2/2011 | Boise |
| 2011/0037951 A1 | 2/2011 | Hua et al. |
| 2011/0038512 A1 | 2/2011 | Petrou et al. |
| 2011/0041100 A1 | 2/2011 | Boillot |
| 2011/0043436 A1 | 2/2011 | Yamamoto |
| 2011/0043680 A1 | 2/2011 | Uehara |
| 2011/0057862 A1 | 3/2011 | Chen |
| 2011/0066682 A1 | 3/2011 | Aldunate et al. |
| 2011/0072492 A1 | 3/2011 | Mohler et al. |
| 2011/0080289 A1 | 4/2011 | Minton |
| 2011/0082390 A1 | 4/2011 | Krieter et al. |
| 2011/0082690 A1 | 4/2011 | Togami et al. |
| 2011/0087534 A1 | 4/2011 | Strebinger et al. |
| 2011/0090148 A1 | 4/2011 | Li et al. |
| 2011/0090444 A1 | 4/2011 | Kimura |
| 2011/0098056 A1 | 4/2011 | Rhoads et al. |
| 2011/0107220 A1 | 5/2011 | Perlman |
| 2011/0107227 A1 | 5/2011 | Rempell et al. |
| 2011/0112771 A1 | 5/2011 | French |
| 2011/0122081 A1 | 5/2011 | Kushler |
| 2011/0125844 A1 | 5/2011 | Collier et al. |
| 2011/0125894 A1 | 5/2011 | Anderson et al. |
| 2011/0125895 A1 | 5/2011 | Anderson et al. |
| 2011/0126047 A1 | 5/2011 | Anderson et al. |
| 2011/0126099 A1 | 5/2011 | Anderson et al. |
| 2011/0126197 A1 | 5/2011 | Larsen et al. |
| 2011/0126207 A1 | 5/2011 | Wipfel et al. |
| 2011/0126275 A1 | 5/2011 | Anderson et al. |
| 2011/0128364 A1 | 6/2011 | Ono |
| 2011/0140994 A1 | 6/2011 | Noma |
| 2011/0150501 A1 | 6/2011 | Guttag et al. |
| 2011/0156998 A1 | 6/2011 | Huang et al. |
| 2011/0157667 A1 | 6/2011 | Lacoste et al. |
| 2011/0161076 A1 | 6/2011 | Davis et al. |
| 2011/0161875 A1 | 6/2011 | Kankainen |
| 2011/0169928 A1 | 7/2011 | Gassel et al. |
| 2011/0185176 A1 | 7/2011 | Takahashi et al. |
| 2011/0187640 A1 | 8/2011 | Jacobsen et al. |
| 2011/0191316 A1 | 8/2011 | Lai et al. |
| 2011/0191432 A1 | 8/2011 | Layson, Jr. |
| 2011/0194029 A1 | 8/2011 | Herrmann et al. |
| 2011/0199389 A1 | 8/2011 | Lu et al. |
| 2011/0213664 A1 | 9/2011 | Osterhout et al. |
| 2011/0214082 A1 | 9/2011 | Osterhout et al. |
| 2011/0221656 A1 | 9/2011 | Haddick et al. |
| 2011/0221657 A1 | 9/2011 | Haddick et al. |
| 2011/0221658 A1 | 9/2011 | Haddick et al. |
| 2011/0221659 A1 | 9/2011 | King, III et al. |
| 2011/0221668 A1 | 9/2011 | Haddick et al. |
| 2011/0221669 A1 | 9/2011 | Shams et al. |
| 2011/0221670 A1 | 9/2011 | King, III et al. |
| 2011/0221671 A1 | 9/2011 | King, III et al. |
| 2011/0221672 A1 | 9/2011 | Osterhout et al. |
| 2011/0221793 A1 | 9/2011 | King, III et al. |
| 2011/0221896 A1 | 9/2011 | Haddick et al. |

(56) References Cited

U.S. PATENT DOCUMENTS

| | | |
|---|---|---|
| 2011/0221897 A1 | 9/2011 | Haddick et al. |
| 2011/0222745 A1 | 9/2011 | Osterhout et al. |
| 2011/0225536 A1 | 9/2011 | Shams et al. |
| 2011/0227812 A1 | 9/2011 | Haddick et al. |
| 2011/0227813 A1 | 9/2011 | Haddick et al. |
| 2011/0227820 A1 | 9/2011 | Haddick et al. |
| 2011/0231757 A1 | 9/2011 | Haddick et al. |
| 2011/0231899 A1 | 9/2011 | Pulier et al. |
| 2011/0238855 A1 | 9/2011 | Korsunsky et al. |
| 2011/0249122 A1 | 10/2011 | Tricoukes et al. |
| 2011/0254855 A1 | 10/2011 | Anders |
| 2011/0267321 A1 | 11/2011 | Hayakawa |
| 2011/0270522 A1 | 11/2011 | Fink |
| 2012/0001846 A1 | 1/2012 | Taniguchi et al. |
| 2012/0005724 A1 | 1/2012 | Lee |
| 2012/0019373 A1 | 1/2012 | Kruse et al. |
| 2012/0021806 A1 | 1/2012 | Maltz |
| 2012/0026191 A1 | 2/2012 | Aronsson et al. |
| 2012/0050143 A1 | 3/2012 | Border et al. |
| 2012/0062445 A1 | 3/2012 | Haddick et al. |
| 2012/0062850 A1 | 3/2012 | Travis |
| 2012/0069131 A1 | 3/2012 | Abelow |
| 2012/0075168 A1 | 3/2012 | Osterhout et al. |
| 2012/0119978 A1 | 5/2012 | Border et al. |
| 2012/0120103 A1 | 5/2012 | Border et al. |
| 2012/0133580 A1 | 5/2012 | Kirby et al. |
| 2012/0139903 A1 | 6/2012 | Rush et al. |
| 2012/0176411 A1 | 7/2012 | Huston |
| 2012/0194418 A1 | 8/2012 | Osterhout et al. |
| 2012/0194419 A1 | 8/2012 | Osterhout et al. |
| 2012/0194420 A1 | 8/2012 | Osterhout et al. |
| 2012/0194549 A1 | 8/2012 | Osterhout et al. |
| 2012/0194550 A1 | 8/2012 | Osterhout et al. |
| 2012/0194551 A1 | 8/2012 | Osterhout et al. |
| 2012/0194552 A1 | 8/2012 | Osterhout et al. |
| 2012/0194553 A1 | 8/2012 | Osterhout et al. |
| 2012/0198532 A1 | 8/2012 | Headley |
| 2012/0200488 A1 | 8/2012 | Osterhout et al. |
| 2012/0200499 A1 | 8/2012 | Osterhout et al. |
| 2012/0200592 A1 | 8/2012 | Kimura |
| 2012/0200601 A1 | 8/2012 | Osterhout et al. |
| 2012/0206322 A1 | 8/2012 | Osterhout et al. |
| 2012/0206323 A1 | 8/2012 | Osterhout et al. |
| 2012/0206334 A1 | 8/2012 | Osterhout et al. |
| 2012/0206335 A1 | 8/2012 | Osterhout et al. |
| 2012/0206485 A1 | 8/2012 | Osterhout et al. |
| 2012/0212398 A1 | 8/2012 | Border et al. |
| 2012/0212399 A1 | 8/2012 | Border et al. |
| 2012/0212400 A1 | 8/2012 | Border et al. |
| 2012/0212406 A1 | 8/2012 | Osterhout et al. |
| 2012/0212414 A1 | 8/2012 | Osterhout et al. |
| 2012/0212484 A1 | 8/2012 | Haddick et al. |
| 2012/0212499 A1 | 8/2012 | Haddick et al. |
| 2012/0218172 A1 | 8/2012 | Border et al. |
| 2012/0218301 A1 | 8/2012 | Miller |
| 2012/0229248 A1 | 9/2012 | Parshionikar et al. |
| 2012/0235883 A1 | 9/2012 | Border et al. |
| 2012/0235884 A1 | 9/2012 | Miller et al. |
| 2012/0235885 A1 | 9/2012 | Miller et al. |
| 2012/0235886 A1 | 9/2012 | Border et al. |
| 2012/0235887 A1 | 9/2012 | Border et al. |
| 2012/0235900 A1 | 9/2012 | Border et al. |
| 2012/0235902 A1 | 9/2012 | Eisenhardt et al. |
| 2012/0236030 A1 | 9/2012 | Border et al. |
| 2012/0236031 A1 | 9/2012 | Haddick et al. |
| 2012/0240185 A1 | 9/2012 | Kapoor et al. |
| 2012/0242678 A1 | 9/2012 | Border et al. |
| 2012/0242697 A1 | 9/2012 | Border et al. |
| 2012/0242698 A1 | 9/2012 | Haddick et al. |
| 2012/0249797 A1 | 10/2012 | Haddick et al. |
| 2012/0287070 A1 | 11/2012 | Wang et al. |
| 2012/0293548 A1 | 11/2012 | Perez et al. |
| 2012/0320155 A1 | 12/2012 | Suh et al. |
| 2013/0044042 A1 | 2/2013 | Olsson et al. |
| 2013/0044129 A1 | 2/2013 | Latta et al. |
| 2013/0127980 A1 | 5/2013 | Haddick et al. |
| 2013/0141419 A1 | 6/2013 | Mount et al. |
| 2013/0208234 A1 | 8/2013 | Lewis |
| 2013/0278631 A1 | 10/2013 | Border et al. |
| 2013/0314303 A1 | 11/2013 | Osterhout et al. |
| 2014/0063054 A1 | 3/2014 | Osterhout et al. |
| 2014/0063055 A1 | 3/2014 | Osterhout et al. |
| 2014/0253605 A1 | 9/2014 | Border et al. |

FOREIGN PATENT DOCUMENTS

| | | |
|---|---|---|
| EP | 0827337 A1 | 3/1998 |
| EP | 1637975 A1 | 3/2006 |
| EP | 1736812 A1 | 12/2006 |
| EP | 1739594 A1 | 1/2007 |
| EP | 2088501 A1 | 8/2009 |
| EP | 2530510 A2 | 12/2012 |
| FR | 2265144 A1 | 10/1975 |
| JP | S62157007 A | 7/1987 |
| JP | H06308891 A | 11/1994 |
| JP | H086660 A | 1/1996 |
| JP | H08136852 A | 5/1996 |
| JP | H10123450 A | 5/1998 |
| JP | 2000207575 A | 7/2000 |
| JP | 2002157606 A | 5/2002 |
| JP | 2002186022 A | 6/2002 |
| JP | 2006229538 A | 8/2006 |
| JP | 2008176681 A | 7/2008 |
| JP | 2008227813 A | 9/2008 |
| JP | 2009222774 A | 10/2009 |
| JP | 2011118402 A | 6/2011 |
| KR | 20110063075 A | 6/2011 |
| WO | 9409398 A1 | 4/1994 |
| WO | 9636898 A2 | 11/1996 |
| WO | 9829775 A1 | 7/1998 |
| WO | 9946619 A1 | 9/1999 |
| WO | 0180561 A1 | 10/2001 |
| WO | 2005034523 A1 | 4/2005 |
| WO | 2007093983 A2 | 8/2007 |
| WO | 2007103889 A2 | 9/2007 |
| WO | 2008087250 A1 | 7/2008 |
| WO | 2008089417 A2 | 7/2008 |
| WO | 2009017797 A2 | 2/2009 |
| WO | 2009073336 A1 | 6/2009 |
| WO | 2010092409 A1 | 8/2010 |
| WO | 2010123934 A1 | 10/2010 |
| WO | 2010129599 A1 | 11/2010 |
| WO | 2010135184 A1 | 11/2010 |
| WO | 2010149823 A1 | 12/2010 |
| WO | 2011003181 A1 | 1/2011 |
| WO | 2011044680 A1 | 4/2011 |
| WO | 2011079240 A1 | 6/2011 |
| WO | 2011106797 A1 | 9/2011 |
| WO | 2011106798 A1 | 9/2011 |
| WO | 2012037290 A2 | 3/2012 |
| WO | 2012037290 A3 | 3/2012 |
| WO | 2012118573 A1 | 9/2012 |
| WO | 2012118575 A2 | 9/2012 |
| WO | 2013049248 A2 | 4/2013 |
| WO | 2013049248 A3 | 4/2013 |
| WO | 2013111471 A1 | 8/2013 |

OTHER PUBLICATIONS

ISA European Patent Office, International Search Report and Written Opinion for Patent Application No. PCT/US2011/026558, Aug. 11, 2011, 11 pages.

ISA European Patent Office, International Search Report and Written Opinion for Patent Application No. PCT/US2011/026559, Aug. 11, 2011, 11 pages.

ISA European Patent Office, International Search Report and Written Opinion for Patent Application No. PCT/US2011/051650, Jul. 11, 2012, 23 pages.

ISA Korean Intellectual Property Office, International Search Report and Written Opinion for Patent Application No. PCT/US2012/022492, Jul. 30, 2012, 10 pages.

(56) References Cited

OTHER PUBLICATIONS

ISA Korean Intellectual Property Office, International Search Report and Written Opinion for Patent Application No. PCT/US2012/022568, Oct. 31, 2012, 9 pages.
ISA Korean Intellectual Property Office, International Search Report and Written Opinion for Patent Application No. PCT/US2012/057387, Mar. 29, 2013, 11 pages.
Ellwood, Jr., Sutherland Cook, "System, Method, and Computer Program Product for Magneto-Optic Device Display," U.S. Appl. No. 60/544,591, filed Feb. 12, 2004, 199 pages.
Border, John N. et al., "See-Through Near-to-Eye Display with Integrated Imager for Simultaneous Scene Viewing, Projected Content Viewing, and User Gesture Tracking," U.S. Appl. No. 13/590,592, filed Aug. 21, 2012, 473 pages. (Submitted in Two Parts).
Border, John N. et al., "Dual Beamsplitter Frontlight for a See-Through Near-to-Eye Display," U.S. Appl. No. 13/591,127, filed Aug. 21, 2012, 478 pages. (Submitted in Two Parts).
Border, John N. et al., "Position Adjustment About a Vertical Axis of a Display of an Optical Assembly in a See-Through Near-to-Eye Display," U.S. Appl. No. 13/591,155, filed Aug. 21, 2012, 475 pages. (Submitted in Two Parts).
Border, John N. et al., "See-Through Near-to-Eye Display with Camera In-Line with the Optical Train," U.S. Appl. No. 13/591,187, filed Aug. 21, 2012, 475 pages. (Submitted in Two Parts).
Osterhout, Ralph F. et al., "RF Shielding of an Augmented Reality Device," U.S. Appl. No. 13/591,148, filed Aug. 21, 2012, 473 pages (Submitted in Three Parts).
Osterhout, Ralph F. et al., "Marker Location in a Virtual Reality Eyepiece," U.S. Appl. No. 13/591,154, filed Aug. 21, 2012, 473 pages (Submitted in Two Parts).
Osterhout, Ralph F. et al., "A See-Through Near-to-Eye Display Adapted to Function in a Retail Environment," U.S. Appl. No. 13/591,158, filed Aug. 21, 2012, 474 pages (Submitted in Two Parts).
Osterhout, Ralph F. et al., "A See-Through Near-to-Eye Display Adapted to Function in an Education Environment," U.S. Appl. No. 13/591,161, filed Aug. 21, 2012, 474 pages (Submitted in Two Parts).
Osterhout, Ralph F. et al., "A See-Through Near-to-Eye Display Adapted to Function in a Transportation Environment," U.S. Appl. No. 13/591,164, filed Aug. 21, 2012, 474 pages (Submitted in Two Parts).
Osterhout, Ralph F. et al., "A See-Through Near-to-Eye Display Adapted to Function in a Home Environment," U.S. Appl. No. 13/591,169, filed Aug. 21, 2012, 474 pages (Submitted in Two Parts).
Osterhout, Ralph F. et al., "A See-Through Near-to-Eye Display Adapted to Function in an Event Environment," U.S. Appl. No. 13/591,173, filed Aug. 21, 2012, 474 pages (Submitted in Two Parts).
Osterhout, Ralph F. et al., "A See-Through Near-to-Eye Display Adapted to Function in a Drinking/Eating Environment with Display Locking on a Feature of the Environment," U.S. Appl. No. 13/591,176, filed Aug. 21, 2012, 474 pages (Submitted in Two Parts).
Osterhout, Ralph F. et al., "A See-Through Near-to-Eye Display Adapted to Function in an Outdoors Environment," U.S. Appl. No. 13/591,180, filed Aug. 21, 2012, 474 pages (Submitted in Two Parts).
Osterhout, Ralph F. et al., "A See-Through Near-to-Eye Display Adapted to Function in an Exercise Environment," U.S. Appl. No. 13/591,185, filed Aug. 21, 2012, 474 pages (Submitted in Two Parts).
United States Patent and Trademark Office, Office Action Issued in U.S. Appl. No. 13/429,644, Nov. 4, 2014, 7 pages.
United States Patent and Trademark Office, Office Action Issued in U.S. Appl. No. 13/342,954, Nov. 4, 2014, 17 Pages.
United States Patent and Trademark Office, Office Action Issued in U.S. Appl. No. 13/342,957, Nov. 20, 2014, 19 Pages.
United States Patent and Trademark Office, Office Action Issued in U.S. Appl. No. 13/342,962, Nov. 6, 2014, 12 Pages.
United States Patent and Trademark Office, Office Action Issued in U.S. Appl. No. 13/357,815, Nov. 5, 2014, 13 Pages.
United States Patent and Trademark Office, Office Action Issued in U.S. Appl. No. 13/049,868, Dec. 3, 2014, 19 Pages.
United States Patent and Trademark Office, Office Action Issued in U.S. Appl. No. 13/232,930, Dec. 8, 2014, 12 Pages.

Aggarwal, C. et al., "Integrating Sensors and Social Networks," Social Network Data Analytics, Chapter 12, pp. 379-412, Mar. 17, 2011, 34 pages.
Ando, T. et al., "Head Mounted Display for Mixed Reality Using Holographic Optical Elements," Mem. Fac. Eng., Osaka City Univ., vol. 40, pp. 1-6, Sep. 1999, 6 pages.
Ando, T. et al., "Head Mounted Display Using Holographic Optical Element," SPIE vol. 3293, Practical Holography XII, pp. 183-189, Mar. 18, 1998, 7 pages.
"Android Muzikant: AutomateIt goes Pro!," http/muzikant-android.blogspot.com/2011/05/automateit-goes-pro.html, May 31, 2011, 11 pages.
Aye, T. et al., "Compact HMD Optics Based on Multiplexed Aberration Compensated Holographic Optical Elements," SPIE vol. 4361, Helmet- and Head-Mounted Displays VI, pp. 89-97, Aug. 22, 2001, 9 pages.
Aye, T., "Miniature Guided Light Array Sequential Scanning Display for Head Mounted Displays," U.S. Army CECOM Sponsored Report, Contract No. DAAB07-98-C-G011, May 15, 1998, 35 pages.
Azuma, R. "A Survey of Augmented Reality," Presence (by MIT), vol. 6, No. 4, pp. 355-385, Aug. 1997, 31 pages.
Azuma, R. et al., "Recent Advances in Augmented Reality," IEEE Computer Graphics and Applications, vol. 21, No. 6, pp. 34-47, Nov. 2001, 15 pages.
BAE Systems, "The Q-Sight Family of Helmet Display Products," Oct. 2007, 4 pages.
Buchmann, V. et al., "FingARtips—Gesture Based Direct Manipulation in Augmented Reality," GRAPHITE '04, 2nd International Conference on Computer Graphics and Interactive Techniques in Australasia and South East Asia, pp. 212-221, Jun. 15, 2004, 10 pages.
Buchmann, V., "Road Stakeout in Wearable Outdoor Augmented Reality," Doctoral Thesis in Philosophy, University of Canterbury, Available as early as Jan. 1, 2008, 203 pages.
Buchroeder, R. et al., "Design of a Catadioptric VCASS Helmet-Mounted Display," Air Force Aerospace Medical Research Laboratory Sponsored Report No. AFAMRL-TR-81-133, Nov. 1981, 73 pages.
Cakmakci, O. et al., "Head-Worn Displays: A Review," Journal of Display Technology, vol. 2, No. 3, pp. 199-216, Sep. 2006, 18 pages.
Cameron, A., "The Application of Holographic Optical Waveguide Technology to Q-Sight Family of Helmet Mounted Displays," SPIE vol. 7326, Head- and Helmet-Mounted Displays XIV: Design and Applications, May 6, 2009, 11 pages.
Cheng, D. et al., "Design of an Optical See-Through Head-Mounted Display With a Low f-Number and Large Field of View Using a Freeform Prism," Applied Optics, vol. 48, No. 14, pp. 2655-2668, May 10, 2009, 14 pages.
Choi, J. et al., "Intelligent Wearable Assistance System for Communicating with Interactive Electronic Media," 13th International Conference on Artificial Reality and Telexistence, Dec. 3-5, 2003, 6 pages.
Creating Flags and Reminders in Outlook, University of Wisconsin Website, http://www.uwex.uwc.edu/outlook/tips/?file=2003-04-25, Apr. 2003, 5 pages.
De Keukelaere, F. et al., "MPEG-21 Session Mobility on Mobile Devices," IFIP TC6 Workshops on Broadband Satellite Communication Systems and Challenges of Mobility, pp. 135-144, Aug. 2004, 7 pages.
Demirbas, M. et al., "Crowd-Sourced Sensing and Collaboration Using Twitter," 2010 IEEE International Symposium on a World of Wireless Mobile and Multimedia Networks (WoWMoM), pp. 1-9, Jun. 2010, 9 pages.
Demiryont, H. et al., "Solid-State Monolithic Electrochromic Switchable Visors and Spectacles," SPIE vol. 7326, Head- and Helmet-Mounted Displays XIV: Design and Applications, May 7, 2009, 8 pages.
Dorfmuller-Ulhaas, K. et al., "Finger Tracking for Interaction in Augmented Environments," IEEE and ACM International Symposium on Augmented Reality, pp. 55-64, Oct. 2001, 10 pages.
Esfahbod, B., "Preload—An Adaptive Prefetching Daemon," Master Thesis in Science, University of Toronto, Available as early as Jan. 1, 2006, 81 pages.

(56) References Cited

OTHER PUBLICATIONS

Fails, J. et al., "Light Widgets: Interacting in Every-Day Spaces," 7th International Conference on Intelligent User Interfaces, pp. 63-69, Jan. 13, 2002, 7 pages.
Ferrin, F., "An Update on Optical Systems for Military Head Mounted Displays," SPIE vol. 3689, Helmet and Head-Mounted Displays IV, pp. 178-185, Apr. 1999, 8 pages.
Fisher, T., "Device Manager," PC Support Website on About.com, http://pcsupport.about.com/od/termsd/p/devicemanager.htm, Available as early as Aug. 16, 2008, 2 pages.
Fisher, T., "Driver," About.com, http://pcsupport.about.com/od/termsag/g/term_driver.htm, Available as early as Oct. 22, 2006, 1 page.
Gafurov, D. et al., "Biometric Gait Authentication Using Accelerometer Sensor," Journal of Computers, vol. 1, No. 7, pp. 51-59, Oct. 2006, 9 pages.
Genc, Y. et al., "Practical Solutions for Calibration of Optical See-Through Devices," ISMAR 2002, International Symposium on Mixed and Augmented Reality, pp. 169-175, Sep. 2002, 9 pages.
Haase, K. et al., "AR Binocular: Augmented Reality System for Nautical Navigation," Lecture Notes in Informatics Series (LNI), Workshop on Mobile and Embedded Interactive Systems, pp. 295-300, Sep. 2008, 6 pages.
Hilton, P., "Ultra-Wide FOV Retinal Display," Physics Applications Ltd, P.O. Box 56, Diamond Harbour, Christchurch, New Zealand, Date believed to be 2005, 4 pages.
Hossack, W. et al., "High-Speed Holographic Optical Tweezers Using a Ferroelectric Liquid Crystal Microdisplay," Optics Express, vol. 11, No. 17, pp. 2053-2059, Aug. 25, 2003, 7 pages.
Hua, H. et al., "Design of a Bright Polarized Head-Mounted Projection Display," Applied Optics, vol. 46, No. 14, pp. 2600-2610, May 10, 2007, 11 pages.
Johnston, R., "Development of a Commercial Retinal Scanning Display," SPIE vol. 2465, Helmet- and Head-Mounted Displays and Symbology Requirements II, May 22, 1995, 12 pages.
Joo, Y. et al., "FAST: Quick Application Launch on Solid-State Drives," 9th USENIX conference on File and Strorage Technologies, Feb. 15, 2011, 14 pages.
Juang, K. et al., "Use of Eye Movement Gestures for Web Browsing," Computer Science Department, Clemson University, Available as early as Jan. 1, 2005, 7 pages.
Kok, A. et al., "A Multimodal Virtual Reality Interface for 3D Interaction with VTK," Knowledge and Information Systems, vol. 13, No. 2, pp. 197-219, Feb. 8, 2007, 23 pages.
Lantz, E., "Future Directions in Visual Display Systems," Computer Graphics, vol. 31, No. 2, pp. 38-42, May 1997, 16 pages.
Liarokapis, F. et al., "Multimodal Augmented Reality Tangible Gaming," The Visual Computer, vol. 25, No. 12, pp. 1109-1120, Aug. 27, 2009, 12 pages.
Liu, S. et al., "An Optical See-Through Head Mounted Display with Addressable Focal Planes," IEEE International Symposium on Mixed and Augmented Reality, pp. 33-42, Sep. 2008, 10 pages.
Liu, Y. et al., "A Robust Hand Tracking for Gesture-Based Interaction of Wearable Computers," Eighth International Symposium on Wearable Computers, vol. 1, pp. 22-29, Oct. 2004, 8 pages.
Maeda, M. et al., "Tracking of User Position and Orientation by Stereo Measurement of Infrared Markers and Orientation Sensing," Eighth International Symposium on Wearable Computers, vol. 1, pp. 77-84, Oct. 2004, 8 pages.
Mas, I. et al., "IPTV Session Mobility," Third International Conference on Communications and Networking in China, pp. 903-909, Aug. 2008, 7 pages.
Miluzzo, E. et al., "CenceMe—Injecting Sensing Presence into Social Networking Applications," 2nd European Conference on Smart Sensing and Context, pp. 1-28, Oct. 23, 2007, 28 pages.
Missig, M., "Diffractive Optics Applied to Eyepiece Design," Master Thesis in Science, University of Rochester, Available as early as Jan. 1, 1994, 148 pages.
Mukawa, H. et al., "A Full Color Eyewear Display Using Holographic Planar Waveguides," SID Symposium Digest of Technical Papers, vol. 39, No. 1, pp. 89-92, May 2008, 4 pages.
Murph, D., "WPI Students Create Wireless 3D Ring Mouse," Engadget at: http://www.engadget.com/2007/05/21/wpi-students-create-wireless-3d-ring-mouse/, May 21, 2007, 3 pages.
Nelson, R. et al., "Tracking Objects Using Recognition," Technical Report 765, University of Rochester, Computer Science Department, Feb. 2002, 15 pages.
Nguyen, L. et al., "Virtual Reality Interfaces for Visualization and Control of Remote Vehicles," Autonomous Robots, vol. 11, No. 1, pp. 59-68, Jul. 2001, 10 pages.
Nolker, C. et al., "Detection of Fingertips in Human Hand Movement Sequences," International Gesture Workshop on Gesture and Sign Language in Human-Computer Interaction, pp. 209-218, Sep. 17, 1997, 10 pages.
Ong, S. et al., "Markerless Augmented Reality Using a Robust Point Transferring Method," 13th International Multimedia Modeling Conference, Part II, pp. 258-268, Jan. 2007, 11 pages.
Pamplona, V. et al., "The Image-Based Data Glove," Proceedings of X Symposium on Virtual Reality (SVR'2008), pp. 204-211, May 2008, 8 pages.
Pansing, C. et al., "Optimization of Illumination Schemes in a Head-Mounted Display Integrated With Eye Tracking Capabilities," SPIE vol. 5875, Novel Optical Systems Design and Optimization VIII, Aug. 30, 2005, 13 pages.
Purdy, K., "Install Speech Macros in Vista," Lifehacker at http://lifehacker.com/397701/install-speech-macros-in-vista, Jul. 2, 2008, 1 page.
Rolland, J. et al., "Head-Mounted Display Systems," Encyclopedia of Optical Engineering, Available as early as Jan. 1, 2005, 14 pages.
Rolland, J. et al., "Head-Worn Displays: The Future Through New Eyes," Optics and Photonics News, vol. 20, No. 4, pp. 20-27, Apr. 2009, 8 pages.
Rolland-Thompson, K. et al., "The Coming Generation of Head-Worn Displays (HWDs): Will the Future Come to Us Through New Eyes?," Presentation at Annual Meeting of the Optical Society of America, Oct. 2009, 40 pages.
Spitzer, M. et al., "Eyeglass-Based Systems for Wearable Computing," First International Symposium on Wearable Computers, pp. 48-51, Oct. 1997, 4 pages.
Starner, T. et al., "Augmented Reality Through Wearable Computing," M.I.T. Media Laboratory Perceptual Computing Section Technical Report No. 397, Presence, Special Issue on Augmented Reality, vol. 6 No. 4, pp. 386-398, Aug. 1997, 9 pages.
Starner, T. et al., "The Perceptive Workbench: Computer Vision-Based Gesture Tracking, Object Tracking, and 3D Reconstruction for Augmented Desks," Machine Vision and Applications, vol. 14, No. 1, pp. 59-71, Apr. 1, 2003, 13 pages.
Starner, T. et al., "Real-Time American Sign Language Recognition Using Desk and Wearable Computer Based Video," M.I.T. Media Laboratory Perceptual Computing Section Technical Report No. 466, Published in IEEE Transactions on Pattern Analysis and Machine Intelligence, vol. 20, No. 12, pp. 1371-1375, Dec. 1998, 7 pages.
Storring, M. et al., "Computer Vision-Based Gesture Recognition for an Augmented Reality Interface," 4th IASTED International Conference on Visualization, Imaging, and Image Processing, pp. 766-771, Sep. 2004, 6 pages.
Sturman, D. et al., "A Survey of Glove-Based Input," IEEE Computer Graphics and Applications, vol. 14, No. 1, pp. 30-39, Jan. 1994, 10 pages.
Takahashi, C. et al., "Polymeric Waveguide Design of a 2D Display System," SPIE vol. 6177, Health Monitoring and Smart Nondestructive Evaluation of Structural and Biological Systems V, Mar. 15, 2006, 9 pages.
Tan, H. et al., "A Haptic Back Display for Attentional and Directional Cueing," Haptics-e, vol. 3 No. 1, Jun. 11, 2003, 20 pages.
Tanenbaum, A., "Structured Computer Organization," 2nd Edition, Introduction, Prentice-Hall, Inc., Jan. 1984, 5 pages.

(56) References Cited

OTHER PUBLICATIONS

Tuceryan, M. et al., "Single Point Active Alignment Method (SPAAM) for Optical See-Through HMD Calibration for AR," IEEE and ACM International Symposium on Augmented Reality, pp. 149-158, Oct. 2000, 10 pages.

Vargas-Martin, F. et al., "Augmented-View for Restricted Visual Field: Multiple Device Implementations," Optometry and Vision Science, vol. 79, No. 11, pp. 715-723, Nov. 2002, 9 pages.

Virtual Hand for CATIA V5, Immersion Corporation Datasheet, Available at www.immersion.com/catia as early as Apr. 2003, 2 pages.

Wacyk, I. et al., "Low Power SXGA Active Matrix OLED," SPIE vol. 7326, Head- and Helmet-Mounted Displays XIV: Design and Applications, May 6, 2009, 11 pages.

Wang, H. et al., "Target Classification and Localization in Habitat Monitoring," 2003 IEEE International Conference on Acoustics, Speech, and Signal Processing, vol. 4, pp. 844-847, Apr. 2003, 4 pages.

Waveguides, Encyclopedia of Laser Physics and Technology Website, Available at www.rp-photonics.com/waveguides.html as Early as Feb. 2006, 3 pages.

Williams, G. et al., "Physical Presence—Palettes in Virtual Spaces," SPIE vol. 3639, Stereoscopic Displays and Virtual Reality Systems VI, May 24, 1999, 11 pages.

Woods, R. et al., "The Impact of Non-Immersive Head-Mounted Displays (HMDs) on the Visual Field," Journal of the Society for Information Display, vol. 11, No. 1, pp. 191-198, Mar. 2003, 8 pages.

Woodward, O., et al., "A Full-Color SXGA TN AMLCD for Military Head-Mounted Displays and Viewer Applications," SPIE vol. 6955, Head- and Helmet-Mounted Displays XIII: Design and Applications, Apr. 2008, 10 pages.

Wu, Y. et al., "Vision-Based Gesture Recognition: A Review," Gesture-Based Communication in Human-Computer Interaction, International GestureWorkshop, Section 3, pp. 103-115, Mar. 1999, 12 pages.

Yalcinkaya, A. et al., "Two-Axis Electromagnetic Microscanner for High Resolution Displays," Journal of Microelectromechanical Systems, vol. 15, No. 4, Aug. 2006, 9 pages.

Yan, T. et al., "mCrowd—A Platform for Mobile Crowdsourcing," 7th ACM Conference on Embedded Networked Sensor Systems, pp. 347-348, Nov. 4, 2009, 2 pages.

Zhai, S., "Text Input, Laws of Action, and Eye-Tracking Based Interaction," Distinguished Lecture Series on the Future of Human-Computer Interaction, Oregon Health & Sciences University, Feb. 28, 2003, 31 pages.

Zhang, R. et al., "Design of a Polarized Head-Mounted Projection Display Using Ferroelectric Liquid-Crystal-on-Silicon Microdisplays," Applied Optics, vol. 47, No. 15, pp. 2888-2896, May 15, 2008, 9 pages.

Zieniewicz, M. et al., "The Evolution of Army Wearable Computers," IEEE Pervasive Computing, vol. 1, No. 4, pp. 30-40, Oct. 2002, 11 pages.

ISA European Patent Office, International Search Report and Written Opinion Issued in Application No. PCT/US2011/026558, Aug. 11, 2011, WIPO, 8 pages.

ISA European Patent Office, International Search Report and Written Opinion Issued in Application No. PCT/US2011/026559, Aug. 11, 2011, WIPO, 8 pages.

ISA European Patent Office, International Search Report and Written Opinion Issued in Application No. PCT/US2011/051650, May 22, 2012, WIPO, 16 pages.

ISA European Patent Office, International Search Report and Written Opinion Issued in Application No. PCT/US2012/022492, Jul. 30, 2012, WIPO, 8 pages.

International Bureau of WIPO, International Preliminary Report on Patentability Issued in Application No. PCT/US2011/026558, Sep. 13, 2012, 6 pages.

International Bureau of WIPO, International Preliminary Report on Patentability Issued in Application No. PCT/US2011/026559, Sep. 13, 2012, 6 pages.

ISA European Patent Office, International Search Report and Written Opinion Issued in Application No. PCT/US2012/022568, Oct. 31, 2012, WIPO, 7 pages.

International Bureau of WIPO, International Preliminary Report on Patentability Issued in Application No. PCT/US2011/051650, Mar. 28, 2013, 11 pages.

ISA European Patent Office, International Search Report and Written Opinion Issued in Application No. PCT/US2012/057387, Mar. 29, 2013, WIPO, 9 pages.

United States Patent and Trademark Office, Office Action Issued in U.S. Appl. No. 13/627,930, Dec. 11, 2013, 7 pages.

European Patent Office, Supplementary European Search Report Issued in Application No. 12837262.0, Jun. 24, 2014, 2 pages.

United States Patent and Trademark Office, Notice of Allowance Issued in U.S. Appl. No. 13/627,930, Jun. 26, 2014, 9 pages.

ISA European Patent Office, International Search Report and Written Opinion Issued in Application No. PCT/US2014/033623, Jul. 4, 2014, WIPO, 12 pages.

European Patent Office, European Examination Report Issued in Application No. 12837262.0, Aug. 15, 2014, 7 pages.

United States Patent and Trademark Office, Office Action Issued in U.S. Appl. No. 13/341,779, Aug. 27, 2014, 14 pages.

United States Patent and Trademark Office, Office Action Issued in U.S. Appl. No. 13/358,229, Aug. 29, 2014, 9 pages.

United States Patent and Trademark Office, Office Action Issued in U.S. Appl. No. 13/049,814, Oct. 3, 2014, 19 pages.

United States Patent and Trademark Office, Office Action Issued in U.S. Appl. No. 13/441,145, Oct. 14, 2014, 23 pages.

United States Patent and Trademark Office, Office Action Issued in U.S. Appl. No. 13/429,415, Oct. 23, 2014, 7 pages.

IPEA European Patent Office, Written Opinion of the International Preliminary Examining Authority Issued in International Application No. PCT/US2014/033623, Feb. 2, 2015, WIPO, 8 pages.

"Augmented Reality—Will AR Replace Household Electronic Appliances?!," Nikkei Electronics, Sep. 2009, 17 pages. (See p. 1, explanation of relevance).

Japanese Patent Office, Office Action Issued in Japanese Patent Application No. 2012-556146, Mar. 26, 2015, 9 pages.

IPEA European Patent Office, International Preliminary Report on Patentability Issued in International Application No. PCT/US2014/033623, May 28, 2015, WIPO, 21 pages.

* cited by examiner

LIGHT CONTROL IN HEAD MOUNTED DISPLAYS

CROSS REFERENCE TO RELATED APPLICATION

The present application is a continuation-in-part of and claims priority to U.S. patent application Ser. No. 13/037,324, filed 28 Feb. 2011, and to U.S. patent application Ser. No. 13/037,335, also filed on 28 Feb. 2011, both of which are hereby incorporated by reference in their entirety.

This application also claims the benefit of the following provisional applications, each of which is hereby incorporated by reference in its entirety:

U.S. Provisional Patent Application 61/308,973, filed Feb. 28, 2010; U.S. Provisional Patent Application 61/373,791, filed Aug. 13, 2010; U.S. Provisional Patent Application 61/382,578, filed Sep. 14, 2010; U.S. Provisional Patent Application 61/410,983, filed Nov. 8, 2010; U.S. Provisional Patent Application 61/429,445, filed Jan. 3, 2011; and U.S. Provisional Patent Application 61/429,447, filed Jan. 3, 2011.

FIELD OF THE INVENTION

The present disclosure pertains to see-through head mounted displays and the control of light entering and exiting the head mounted display.

BACKGROUND

See-through head mounted displays allow a user to view a displayed image or a see-through view of the scene in front of the user. See-through head mounted displays can also allow the user to view a combined image comprised of a displayed image and a see-through view of the scene in front of the user in which the displayed image is overlaid on the see-through view. In different modes of operation, the see-through head mounted display can present the displayed image so that the area of the displayed image is transparent, semitransparent or opaque. In the transparent mode, the see-through view of the scene is unblocked and an overlaid displayed image can be provided with low contrast. In the semitransparent mode, the see-through view of the scene is partially blocked and an overlaid displayed image can be provided with higher contrast. In the opaque mode, the se-through view of the scene is fully blocked and an overlaid displayed image can be provided with high contrast.

Alternatively, some head-mounted displays provide a see-through display for an augmented reality view in which real-world scenes are visible to a user but additional image information is overlaid on the real-world scenes. Such an augmented reality view is provided by helmet mounted see-through displays found in military applications and by heads-up displays (HUDs) in the windshields of automobiles. In this case, there can be multiple areas for displaying images over the see-through view.

U.S. Pat. No. 5,151,722 describes a head mounted display with a folded optical path and a beam splitter with a curved mirror to present an image from a CRT image source to the user's eye. The image source is positioned on the side of the user's head with the optical path multiply folded to present the image light from the image source into the user's eye. The curved mirror is positioned between the user's eye and the scene in front of the user. A see-through version of the head mounted display is also discussed wherein the curved mirror is a partially reflective mirror so the user can see through the curved mirror to view the scene in front of the user. However, the CRT image source is large and heavy so that it is not well suited for head mounted displays. The multiply folded geometry with the image source located on the side of the user's head makes for a larger beam splitter and a thicker geometry in front of the user's eye so that the overall size of the head mounted display is larger. Image light that passes through the partially reflecting mirror is uncontrolled and as such, a portion of the image light escapes through the front of the see-through head mounted display and is seen externally as eyeglow.

U.S. Pat. No. 5,699,194 discloses a see-through head mounted display with a waveguide wherein the outer surface is a partially reflecting mirror. In this see-through head mounted display, image light from the image source is reflected multiple times from different areas of the partially reflecting mirror before the image light is presented to the user's eye. In addition, a corrective lens is provided so that distortions of the see-through view of the scene are reduced. And, a liquid crystal shutter is provided to block incoming light from the scene so that the see-through headmounted display can be operated in an opaque mode. Image light that passes through the partially reflecting mirror is uncontrolled and as such, a portion of the image light escapes through the front of the see-through head mounted display and is seen externally as eyeglow.

U.S. Pat. No. 6,693,749 describes a head mounted display with a polarizing beam splitter cube to reduce light losses and improve efficiency. An image source is positioned above the user's eye and the optical path is folded once to present the image light from the image source to the user's eye. A curved fully reflecting mirror is positioned below the user's eye to focus the image light at the user's eye. An unpolarized image source is used so that half of the image light from the image source passes through the polarizing beam splitter while the other half of the light is reflected away from the user's eye and toward the scene in front of the user. A polarizer is positioned in front of the polarizing beam splitter cube to block the half of the light that is reflected away from the user's eye and thereby make the user less observable by others in the neighboring environment. However, the polarizing beam splitter cube is large and heavy, so that it is not well suited for use in a head mounted display. Further, the curved mirror is also relatively large so that by locating the mirror below the user's eye, the thickness of the see-through head mounted display is necessarily larger.

There is a need, therefore, for an improved see-through head-mounted display that provides a thinner, lighter weight display which also controls escaping light to reduce eyeglow.

SUMMARY

The present disclosure provides a see-through head mounted display that is thin and light in weight with a light control element to selectively block escaping image light and thereby reduce eyeglow.

In one embodiment, a see-through head mounted display apparatus is provided. The see-through head mounted display apparatus includes a see-through display assembly including an image source and a partially reflecting mirror. The partially reflecting mirror reflects and transmits respective portions of image light from the image source and scene light from a see-through view of an external environment. A combined image comprised of portions of the reflected image light and the transmitted scene light is provided to a user's eye. A light control element is provided to block escaping light comprised of the transmitted portion of image light and the reflected portion of scene light, while allowing a portion of incoming scene light to be transmitted from the external environment to the see-through display assembly. The light control element transmits a higher percentage of incoming scene light than the percentage of escaping light that is not blocked.

In another embodiment, a method for viewing an image with reduced eyeglow on a see-through head mounted display having a front and a back is provided. The method includes steps of providing image light to a partially reflecting mirror from an image displayed on an image source and reflecting a first portion of the image light from the partially reflecting mirror while transmitting a second portion of the image light through the partially reflecting mirror. The method also includes steps of transmitting a first portion of scene light from the external environment through a light control element at the front of the see-through head mounted display. Additional steps include transmitting a second portion of the scene light through the partially reflecting mirror while reflecting a third portion of the scene light from the partially reflecting mirror, and combining the first portion of the image light with the second portion of the scene light to provide a combined image to a viewer's eye at the back of the see-through head mounted display comprised of the image displayed on the image source overlaid on a view of the external environment. The method also includes a step of using the light control element to block the transmitted second portion of the image light and the reflected third portion of the scene light to reduce eyeglow.

DETAILED DESCRIPTION

In a see-through head mounted display, a displayed image can be viewed by a user at the same time that a see-through view of the scene from the surrounding environment can be viewed. The displayed image and the see-through view can be viewed as a combined image where the displayed image is overlaid on the see-through view or the displayed image and the see-through view can be simultaneously viewed in different portions of the see-through display that are viewable by the user.

Figure 1:
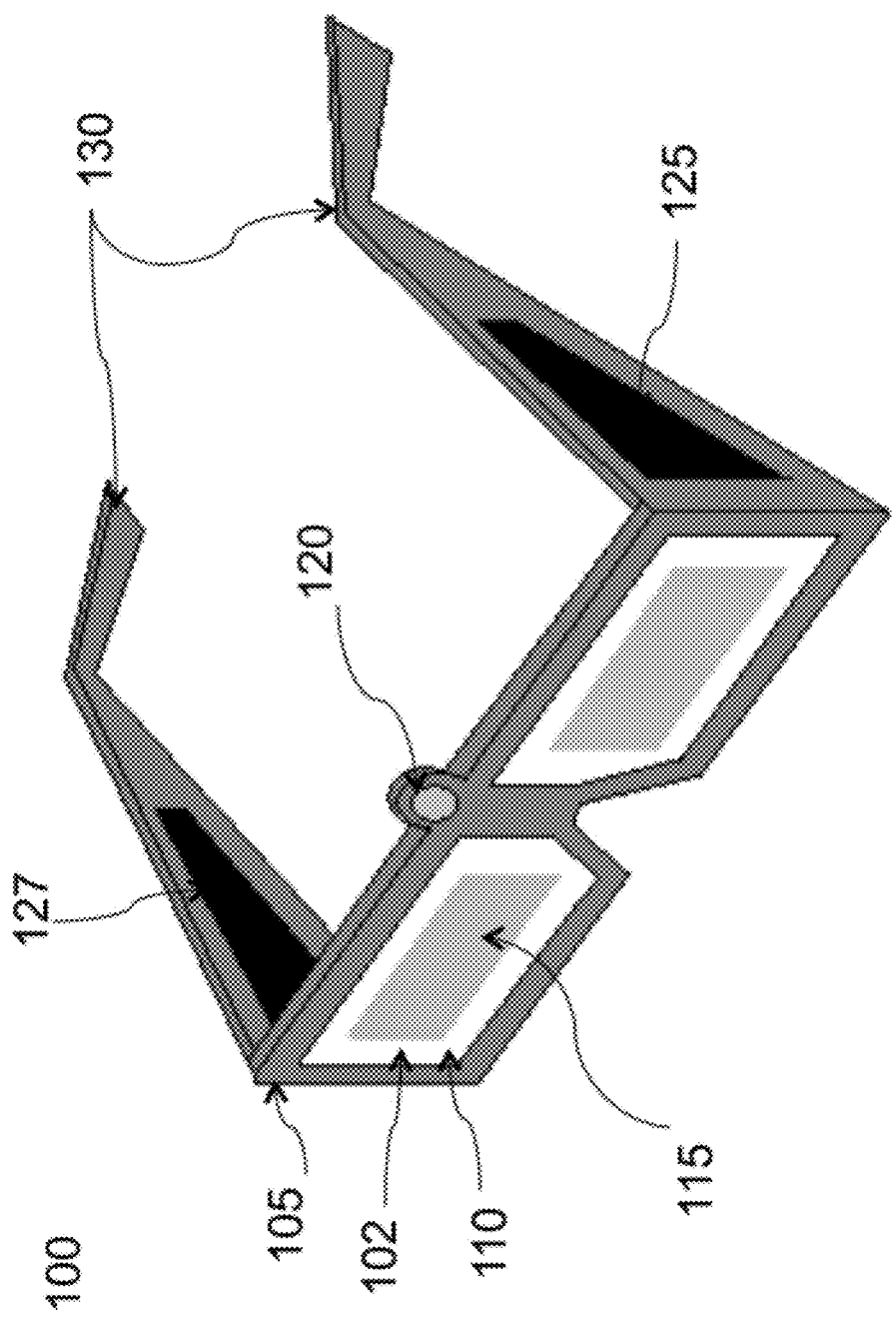
FIG. 1 is an illustration of a see-through head mounted display device.

FIG. 1 shows an illustration of a see-through head mounted display device 100. The device includes a frame 105 with lenses 110 that have display areas 115 and clear areas 102. The device also has image sources and associated optics (not shown) to present image light from the image source to the display areas 115, wherein the image sources and associated optics can be located at the top, bottom or side of the display areas 115. The frame 105 is supported on the viewer's head with arms 130. The arms 130 also contain electronics 125 including a processor to drive the displays and peripheral electronics 127 including batteries and wireless connection(s) to other information sources such as can be obtained on the internet or from localized servers through Wi-Fi, Bluetooth, cellular or other wireless technologies. A camera 120 can be included to capture images of the surrounding environment. The locations of the various components in the see-through head mounted display device 100 are shown as an example, other locations are possible.

Figure 2:
FIG. 2 is an illustration of a combination image as seen by a user when the see-through display device is operated in a transparent mode.
Figure 3:
FIG. 3 is an illustration of a combination image as seen by a user when the see-through display device is operated in a semi-transparent mode.

The see-through head-mounted display device 100 can further include controllable darkening layers in the display areas 115 wherein the controllable darkening layers can change opacity behind the respective portions of the display area 115 to enable changes in operating mode between transparent, semi-transparent and opaque in the areas where images are displayed. The controllable darkening layers can be segmented so that images can be displayed over different areas of the lenses 110. FIG. 2 shows an example of a combined image as seen by a user using a see-through head mounted display device 100 wherein the see-through head mounted display device 100 is operating in a transparent mode. As can be seen in FIG. 2, the displayed image seen by the user has a low contrast and objects from the see-through view are easily seen in the display area 115. FIG. 3 shows an example of a combined image as seen by a user using a see-through head mounted display device 100 wherein the see-through head mounted display device 100 is operating in a semi-transparent mode. As can be seen in FIG. 3, the displayed image seen by the user has a higher contrast and objects from the see-through view are very dim in the display area 115.

A wide variety of see-through head mounted display devices 100 are known in the art. See-through head-mounted display devices 100 can provide image information to one eye of the user or both eyes of the user. See-through head mounted display devices 100 that present image information to both eyes of the user can have one or two image sources. Monoscopic viewing in which the same image information is presented to both eyes is done with see-through head mounted display devices 100 that have one or two image sources. Stereoscopic viewing typically requires a head-mounted display device 100 that has two image sources with different images being presented to the user's eyes wherein the different images have different perspectives of the same scene.

A variety of image sources to provide images for display are known in the art including, for example, organic light-emitting diode (OLED) displays, quantum dot based light emitting diodes (QLED) displays, liquid crystal displays (LCDs), or liquid crystal on silicon (LCOS) displays. In addition, the image sources can be microprojectors or microdisplays with associated optics to present the image light to the display areas 115 so that the user can view the displayed images with his/her eyes.

The optics associated with the image sources relay the image light from the image sources to the display areas 115. The optics can comprise refractive lenses, reflective lenses, mirrors, diffractive lenses, holographic lenses or waveguides. For a see-through head mounted display device 100, the user should be provided with at least a partial view of the scene in front of the see-through head-mounted display device 100 within the user's field of view. The present disclosure concerns see-through head mounted display devices 100 that have optics associated with the image source that include a partially reflective mirror for simultaneously presenting image light and scene light to the user so that the user is provided with a displayed image overlaid on at least a partial see-through view of the scene in front of the user. Wherein the partially reflective mirror can be any type of reflecting mirror surface that also allows some portion of the incident light to be transmitted such as for example a partially metalized coated surface or a dielectric multilayer mirror coated surface.

Figure 1A:
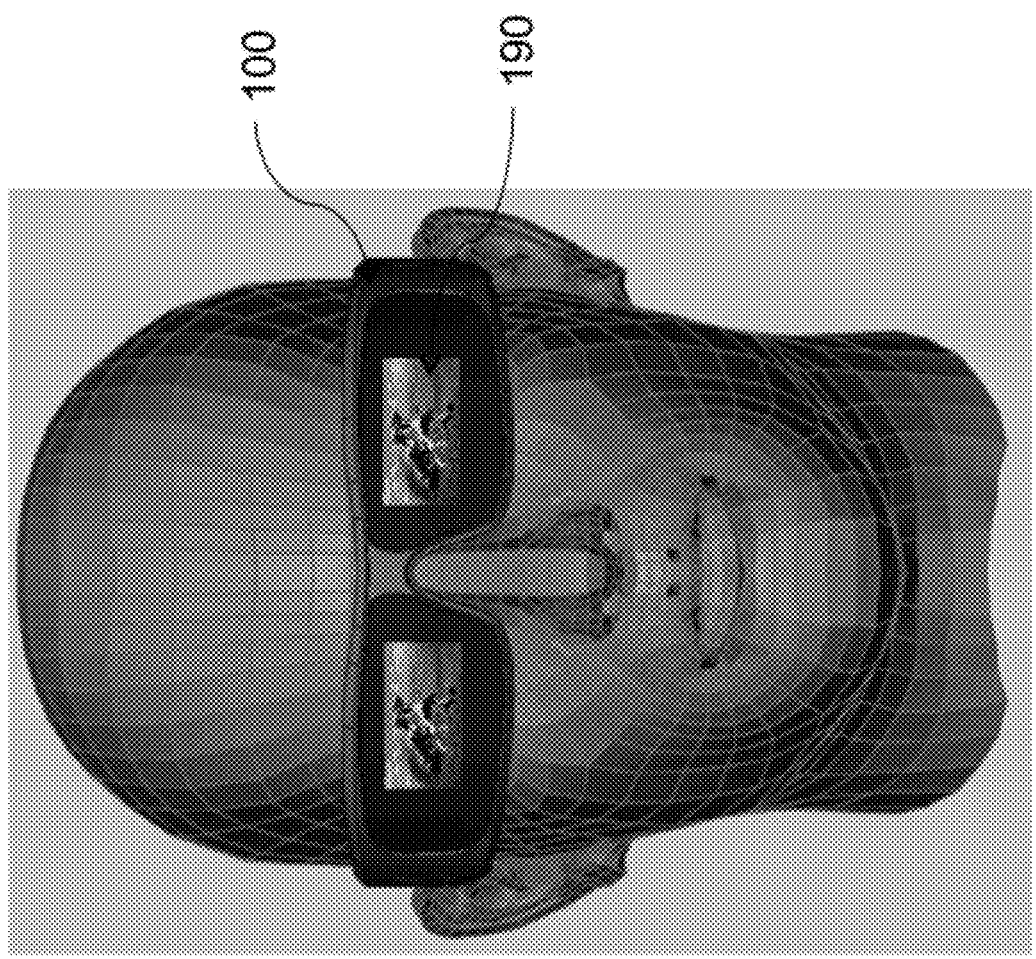
FIG. 1A is an illustration of a user with a see-through head mounted display device wherein eyeglow is depicted.

When using a see-through head mounted display, light losses from the display areas 115 and from light reflected or scattered from the image source or associated optics or light reflected or scattered from the user, contribute light that passes from the see-through head mounted display into the environment. These light losses are perceived by external viewers as eyeglow where portions of the lenses 110 or the areas surrounding the see-through head mounted display device 100 appear to be glowing when viewed in a dimly lit environment. In certain cases of eyeglow as shown in FIG. 1A, the displayed image can be seen as an observable image 190 in the display areas 115 when viewed externally by external viewers. To maintain privacy of the viewing experience for the user both in terms of maintaining privacy of the images being viewed and in terms of making the user less noticeable when using the see-through head mounted display device 100 in a dimly lit environment, it is preferable to reduce eyeglow. This disclosure provides methods and apparatus that reduce eyeglow in see-through head mounted displays such as the see-through head mounted display devices 100 which include a partially reflective mirror in the optics associated with the image source.

Figure 4:
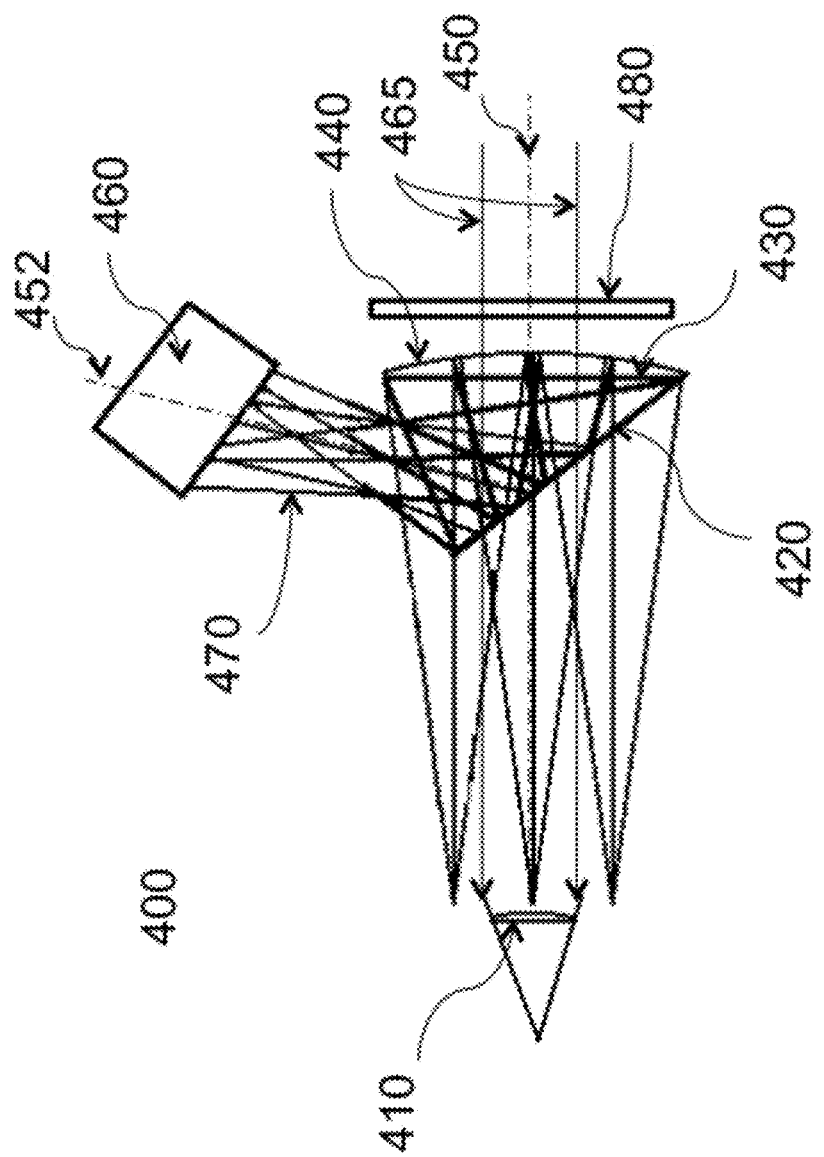
FIG. 4 is a schematic view of a cross-section of a see-through display assembly.
Figure 5:
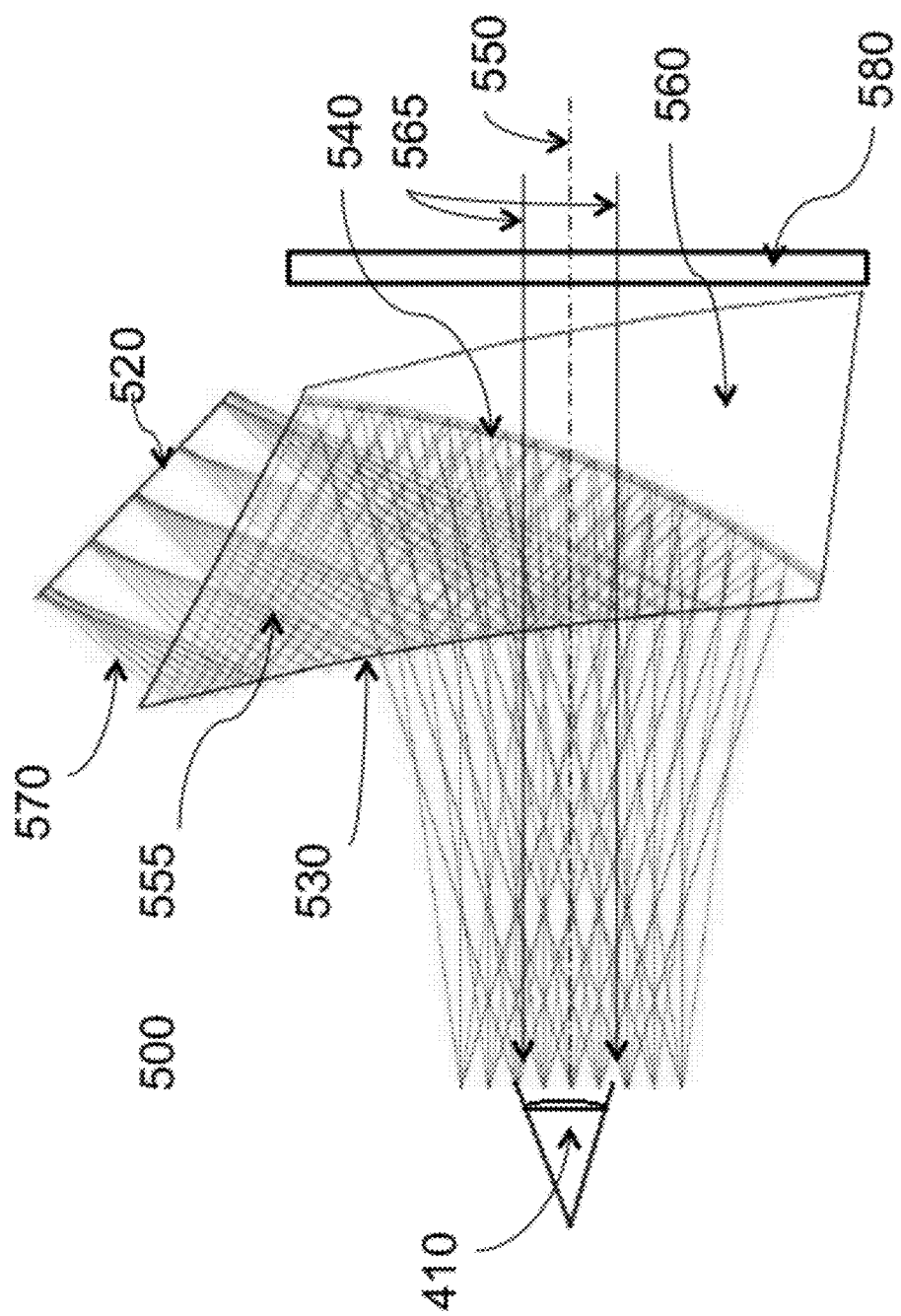
FIG. 5 is a schematic view of a cross-section of a see-through display assembly.

FIGS. 4 and 5 provide examples of optics associated with image sources for see-through head mounted display devices 100 that include partially reflective mirrors 440 and 540. Light control elements 480 and 580 block image light that passes through the partially reflective mirrors 440 and 540 respectively to reduce escaping light that contributes to eyeglow.

Turning first to FIG. 4, the optics associated with the image source in this example will be described. In this example, the image source includes a projection system (not shown) to provide image light with an optical layout that includes a first horizontal optical axis located in or along the upper portion of the frame 105 in the see-through head mounted display device 100. The optics along this first horizontal axis can include lenses to focus the image light 470 to provide a focused displayed image from the image source to the user's eye 410. A folding mirror 460 then redirects the image light 470 from the first horizontal axis to a non-vertical optical axis 452 that proceeds to a see-through display assembly 400 with a beam splitter layer 420 and a second horizontal optical axis 450. The beam splitter layer 420 can be a partially reflecting mirror or a polarizing beam splitter layer. The beam splitter layer 420 in the see-through display assembly 400 is oriented at an angle to the non-vertical optical axis and the second horizontal optical axis 450 to provide a thinner see-through display assembly 400. The beam splitter layer 420 reflects and redirects at least a portion of the image light 470 along the second horizontal optical axis 450 in a direction away from the user's eye 410. A first portion of the image light 470 that has been reflected by the beam splitter layer 420, is then reflected back toward the user's eye 410 by a partially reflecting mirror 440. The partially reflecting mirror 440 can be spherical or aspheric as appropriate to present a focused image to the user's eye 410. The reflected first portion of the image light 470 then passes back through the beam splitter and is focused at the user's eye 410.

At the same time, a second portion of the image light 470 that has been reflected by the beam splitter layer 420, is transmitted through the partially reflecting mirror 440. It is this second portion of image light 470 that escapes from the see-through display assembly 400 to contribute to eyeglow in the form of an observable image 190 that can be seen by external viewers. Light control element 480 blocks the second portion of the image light 470 thereby reducing escaping light and reducing eyeglow. In one embodiment, the light control element 480, the partially reflecting mirror 440, the beam splitter layer 420 and the user's eye 410 are all located along a common optical axis, the second horizontal optical axis 450. Simultaneously, a first portion of scene light from the external environment 465 passes through the light control element 480. A second portion of the scene light 465 then passes through the partially reflective mirror 440 and the beam splitter layer 420 to combine with the first portion of the image light 470 to present a combined image to the user's eye 410. The combined image includes the displayed image from the image source overlaid onto at least a partial see-through view of the external environment in front of the user.

At the same time, a third portion of the scene light 465 is reflected by the partially reflecting mirror 440. This third portion of scene light 465 also contributes to eyeglow since it escapes from the see-through display assembly 400. However, the third portion of scene light 465 contributes a generally reflected light from the environment and as such does not contribute to the observable image 190 that can be seen by external viewers. The eyeglow produced by the third portion of scene light 465 is seen by external viewers as a general brightness in the lenses 110 or as a reflected image of the external scene in front of the user.

In an embodiment, the image source provides linearly polarized image light 470 and the beam splitter layer 420 is a partially reflective mirror. Linearly polarized image light can be provided by various means including microdisplays with linearly polarized illumination such as LCOS displays or LCD displays, alternately self-luminous displays (such as OLED, QLED and transmissive LCOS) with a linear polarizer can be used to provide linearly polarized image light 470. With linearly polarized image light 470 and a partially reflective mirror as the beam splitter layer 420, the light control element 480 is a linear polarizer. Wherein the linear polarizer in the light control element 480 is oriented relative to the linearly polarized image light 470 so that the second portion of the linearly polarized image light 470 that passes through the partially reflecting mirror 440 is blocked and eyeglow is reduced.

Figure 6:
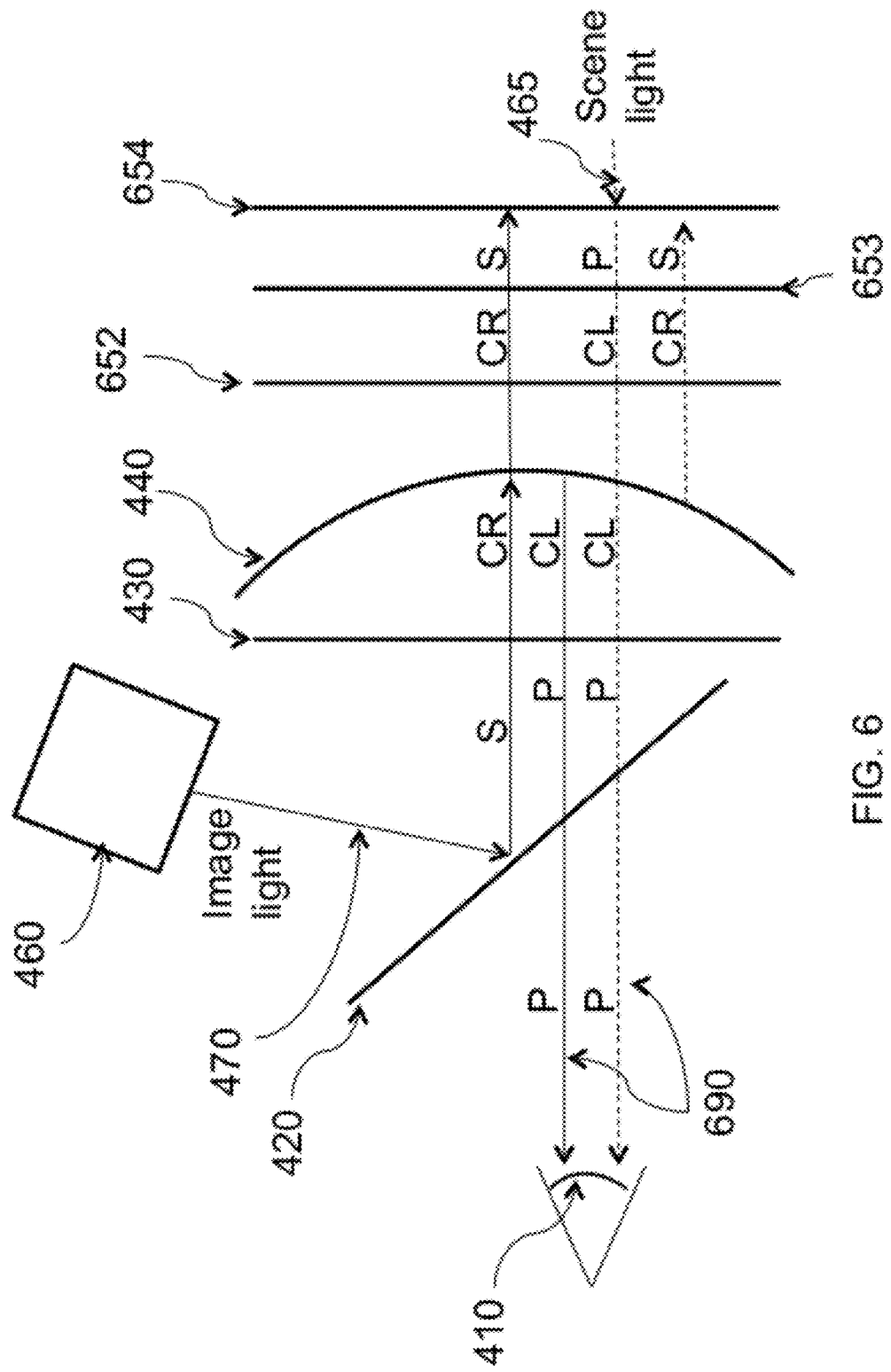
FIG. 6 is an illustration of an example of the polarization control used to reduce eyeglow.

In a further embodiment, the beam splitter layer 420 is a polarizing beam splitter, or the image source provides polarized image light 470 and the beam splitter layer 420 is a polarizing beam splitter, so that the reflected image light 470 is linearly polarized light, this embodiment and the associated polarization control is shown in FIG. 6. For the case where the image source provides linearly polarized image light and the beam splitter layer 420 is a polarizing beam splitter, the polarization state of the image light is aligned to the polarizing beam splitter so that the image light 470 is reflected by the polarizing beam splitter. FIG. 6 shows the reflected image light as having S state polarization. In cases where the beam splitter layer 420 is a polarizing beam splitter, a first quarter wave film 430 is provided between the beam splitter layer 420 and the partially reflecting mirror 440.

The first quarter wave film 430 converts the linearly polarized image light to circularly polarized image light (shown as S being converted to CR in FIG. 6). The reflected first portion of image light 470 is then also circularly polarized where the circular polarization state is reversed (shown as CL in FIG. 6) so that after passing back through the quarter wave film, the polarization state of the reflected first portion of image light 470 is reversed (to P polarization) compared to the polarization state of the image light 470 provided by the image source (shown as S). As a result, the reflected first portion of the image light 470 passes through the polarizing beam splitter without reflection losses. When the beam splitter layer 420 is a polarizing beam splitter and the see-through display assembly 400 includes a first quarter wave film 430, the light control element 480 is a second quarter wave film 653 and a linear polarizer 654. Wherein the second quarter wave film 653 converts the second portion of the circularly polarized image light 470 into linearly polarized image light 470 (shown as CR being converted to S) with a polarization state that is blocked by the linear polarizer 654 in the light control element 480 so that eyeglow is reduced.

When the light control element 480 includes a linear polarizer 654 and a quarter wave film 653, incoming unpolarized scene light 465 from the external environment in front of the user is converted to linearly polarized light (shown as P polarization state in FIG. 6) while 50% of the light is blocked. The first portion of scene light 465 that passes through the linear polarizer 654 is linearly polarized light which is converted by the quarter wave film to circularly polarized light (shown as P being converted to CL in FIG. 6). The third portion of scene light that is reflected from the partially reflecting mirror 440 has reversed circular polarization (shown as converting from CL to CR in FIG. 6) which is then converted to linearly polarized light by the second quarter wave film 653 (shown as CR converting to S polarization in FIG. 6). The linear polarizer 654 then blocks the reflected third portion of the scene light thereby reducing escaping light and reducing eyeglow.

As shown in FIG. 6, the reflected first portion of image light 470 and the transmitted second portion of scene light have the same circular polarization state (shown as CL) so that they combine and are converted by the first quarter wave film 430 into linearly polarized light (shown as P) which passes through the beam splitter when the beam splitter layer 420 is a polarizing beam splitter. The linearly polarized combined light 690 then provides a combined image to the user's eye 410 located at the back of the see-through display assembly 400, where the combined image is comprised of overlaid portions of the displayed image from the image source and the see-through view of the external environment in front of the user.

The example optics associated with image sources for see-through head mounted display devices 100 shown in FIG. 5 as see-through display assembly 500 will now be addressed. In this example, an image source 520 that provides linearly polarized image light 570 is used. The linearly polarized image light 570 enters a waveguide 555 wherein the light is first reflected by total internal reflection from the back surface 530, a first portion of the image light 570 is reflected from a partially reflecting mirror 540 and then transmitted through surface 530 to present an image from the image source 520 to the user's eye 410. The user looks through the waveguide 555 and the partially reflecting mirror 540 to obtain a see-through view of the external scene in front of the user. Due to distortions imparted by the thick layers of optical material in the waveguide 555, a corrective element 560 is provided to reduce distortions in the see-through view seen by the user. The combined image presented to the user's eye 410, comprised of the displayed image from the image source 520 overlaid on at least a portion of a see-through view of the external scene, is formed from the image light 570 and the scene light 565. In this example, eyeglow comes from a second portion of image light 570 that is transmitted through the partially reflecting mirror 540 where it passes through the corrective element 560 and escapes from the see-through display assembly 500.

In this case, the linear polarization of the image light 570 is maintained so that the second portion of image light 570 that escapes from the see-through display assembly 500 has the same linear polarization as the image light 570 provided by the image source 520. The light control element 580 for this embodiment comprises a linear polarizer that is oriented along with the image source 520 so that escaping light is blocked. The polarization state of the image light 570 and the orientation of the linear polarizer in the light control element 580 are chosen together to block escaping light. As an example, if the image source 520 provides S polarized image light 570, the linear polarizer in the light control element 580 is oriented to block S polarized light. As shown in FIG. 5, the light control element 580, the corrective element 560, the partially reflective mirror 540, the waveguide 555 and the user's eye 410 are all located on a common optical axis 550. In addition, while FIG. 5 shows image light 570 being reflected once on surface 530 and once on partially reflecting mirror 540, waveguides can be used where multiple reflections of the image light 570 occur on either the surface 530 or the partially reflective mirror 540.

It should be noted, that the embodiments may include see-through display assemblies 400 and 500 where partially reflective mirrors 440 and 540 respectively are located on common optical axes with the user's eye 410 and light control elements 480 and 580 respectively. This optical layout has been selected to provide the additional benefit of providing a thin see-through display assembly with a large displayed field of view overlaid onto the see-through field of view. To provide a large displayed field of view, the portion of the partially reflective mirror where the image is displayed must be relatively large. By including an angled beam splitter layer as shown in FIG. 4, it is possible to locate the partially reflective mirror above or below the see-through field of view. However, if the partially reflective mirror is located with an optical axis that is perpendicular to the optical axis associated with the see-through field of view, the lateral dimension of the partially reflective mirror increases the thickness of the see-through display assembly substantially.

As a result, the embodiments may include partially reflective mirrors that share an optical axis with the see-through field of view so that the large dimension of the partially reflective mirror that is associated with the large displayed field of view is vertical and as such does not contribute to the thickness of the see-through display assembly. However, since the partially reflective mirror is located on the optical axis of the see-through field of view, the partially reflective mirror must be both partially reflective to provide the displayed image and partially transparent to provide the see-through view. As an example, a see-through display assembly was designed similar to that shown in FIG. 4 for a 30 degree field of view displayed image. The partially reflective mirror was then 15 mm high. By positioning the partially reflective mirror in front of the user, the thickness of the see-through display assembly from the front of the partially reflective mirror to the back of the beam splitter layer was reduced to 10 mm.

In a further embodiment, the light control layer includes an electrically controllable darkening layer to reduce the amount of scene light entering the see-through head mounted display. The controllable darkening layer is controlled in response to detected changes in the environment, changes in the user's movements or changes in the type of images being displayed. In one embodiment, the controllable darkening layer is segmented to provide differential control in the display areas and the clear areas of the lens to provide a displayed image with higher contrast. Examples of controllable darkening layers include various types of liquid crystal layers, electrowetting layers or electrochromic layers.

Figure 7:
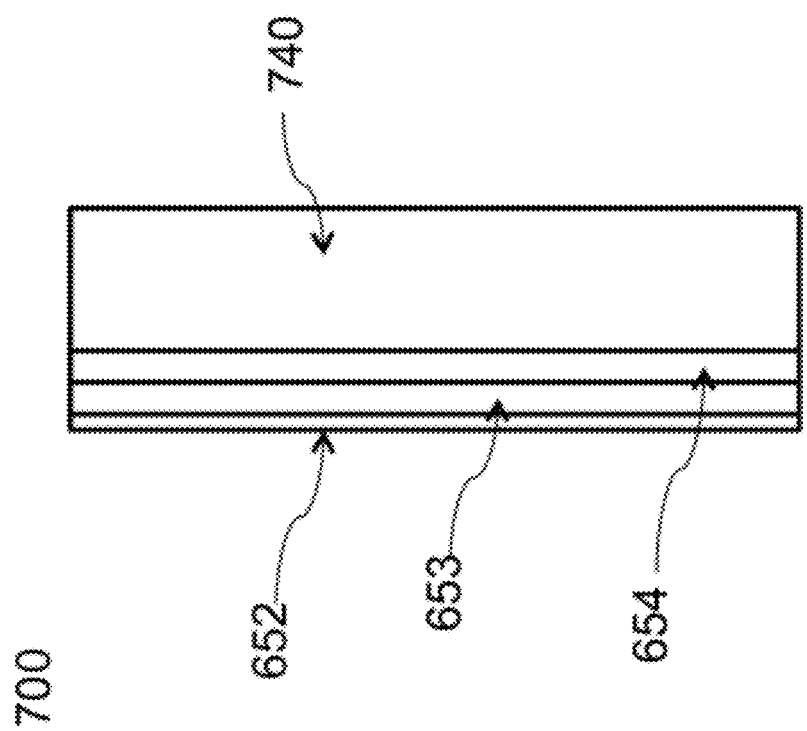
FIG. 7 is a schematic cross-section of a light control element.

FIG. 7 shows a cross-sectional view of a light control element 700. Light control element 700 includes a controllable darkening layer 652, a quarter wave film 653, a linear polarizer 654 and a support layer 740. In another embodiment, light control element 700 can be a separate replaceable element in the see-through head mounted display device 100. In this way, different levels of functionality can be built into the light control element 700 such as different color tints or thicker support layers 740 to provide increased impact resistance, ballistic protection or laser protection. Impact resistance can be provided with a high impact plastic such as polycarbonate and ballistic protection can be provided with a laminated component, as in bullet proof glass. Laser protection can also be provided, for example, with cut filters to block laser wavelengths. In a further example, the support layer 740 can include photochromic materials which automatically darken when in bright environments to block a portion of the scene light thereby making it easier to view displayed images.

In another example, the controllable darkening layer 652 can be included in some versions of the light control element 700 to block a portion of the scene light to provide improved viewing conditions with higher contrast displayed images in portions of the combined image Simpler versions of light control element 700 may simply omit the controllable darkening layer 652. As previously discussed, the quarter wave film 653 should be left out of the light control element 700 when used with certain types of see-through display assemblies 400 such as when the image source provides linearly polarized image light 470 and the beam splitter layer 420 is a partially reflective mirror or when a see-through display assembly 500 is used.

Figure 8:
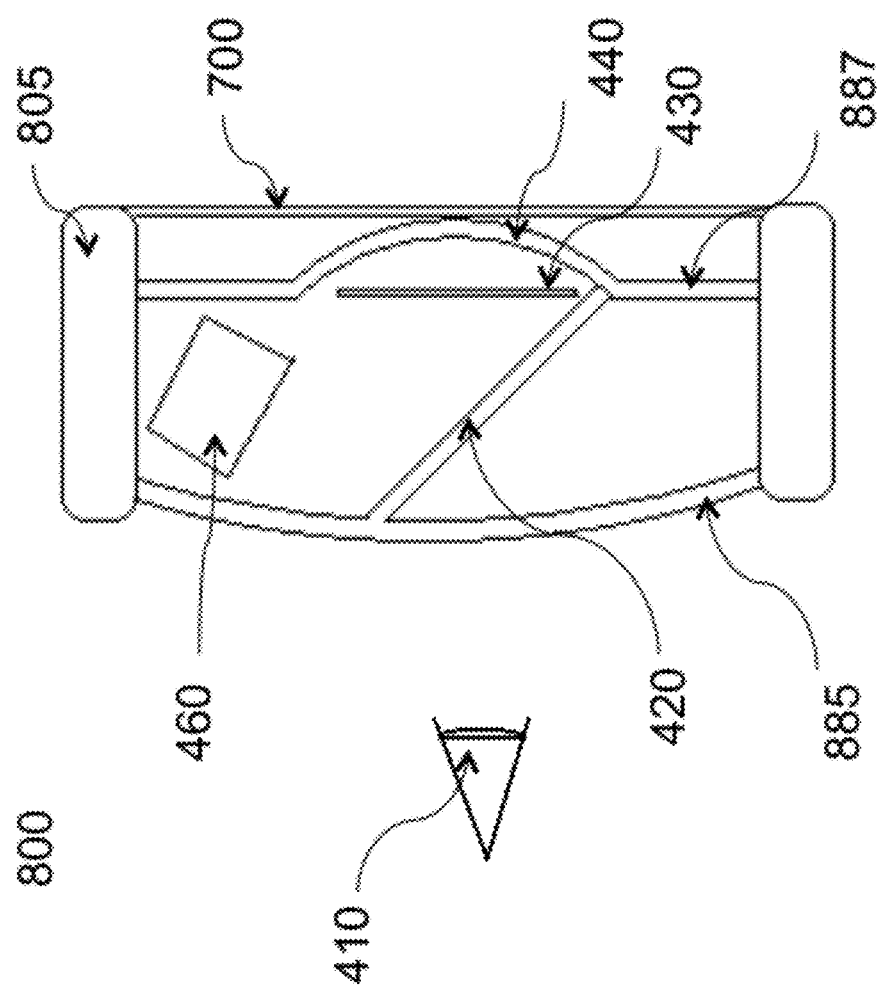
FIG. 8 is a schematic cross-section of a see-through display assembly with a light control element mounted in a glasses frame.

FIG. 8 shows an example of a see-through display assembly with a light control element 480 in a glasses frame. The glasses cross-section 800 shows the components of see-through display assembly 400 in a glasses frame 805. Wherein, the light control element 480 covers the entire see-through view seen by the user. Supporting members 887 and 885 are shown supporting the partially reflecting mirror 440 and the beam splitter layer 420 respectively in the field of view of the user's eye 410. The supporting members 885 and 887 along with the light control element 700 are connected to the glasses frame 805. The other components such as the folding mirror 460 and the first quarter wave film 430 are also connected to the supporting members 887 and 885 so that the combined assembly is structurally sound.

Figure 9:
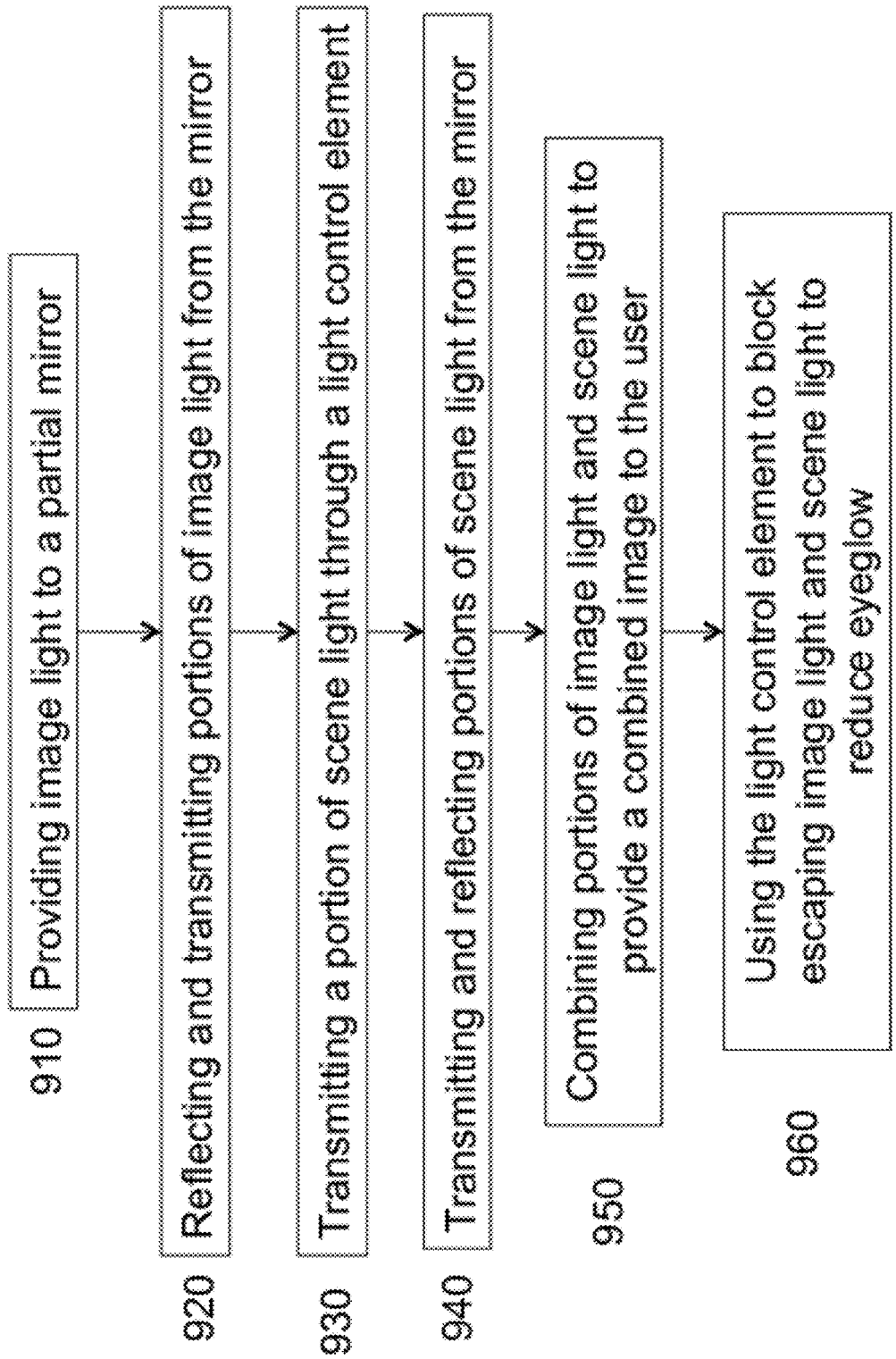
FIG. 9 is a flowchart describing a method disclosed herein.

FIG. 9 describes a method of using the present disclosure. In step 910, image light is provided by an image source, such as a microdisplay, to a partially reflecting mirror. In step 920, the partially reflecting mirror reflects a first portion of the image light while transmitting a second portion of image light. In step 930, a first portion of scene light is transmitted through a light control element. A second portion of the scene light is transmitted through the partially reflecting mirror while a third portion of the scene light is reflected from the partially reflecting mirror in step 940. In step 950 the first portion of image light and the second portion of scene light are combined to provide a combined image to the user's eye wherein the combined image is comprised of the displayed image from the image source overlaid on a see-through view of the external scene in front of the user. In step 960, the light control element blocks escaping light from the second portion of the image light and the third portion of the scene light to thereby reduce eyeglow. Wherein the percentage of light in the first portion of scene light that is transmitted through the light control element is larger than the percentage of escaping light from the second portion of image light and the third portion of scene light that is not blocked by the light control element.

The partially reflecting mirror included in the apparatus can have a range of reflectivity from 20% to 80%. Wherein the lower levels of reflectivity provide for more scene light to be presented to the user's eye so that the see-through view is brighter but, higher levels of image light will escape so that power usage for the image source will be increased to provide a displayed image with a given level of brightness. In contrast, higher levels of reflectivity provide for less scene light to be presented to the user's eye so that the see-through view is dimmer and lower levels of image light will escape, so that power usage for the image source will be reduced to provide a displayed image with a given level of brightness.

By using polarization based methods to reduce eyeglow, the efficiency of the light usage is increased. Linear polarizers typically block 99.9% or greater of one linear polarization state while allowing 99.9% of the other linear polarization state to pass through. Unpolarized light is comprised of a mixture of the two linear polarization states so that 50% of the unpolarized light is blocked and 50% passes through the linear polarizer. Purely absorbing filters or purely reflecting filters cannot block a higher percentage of light than they pass under any circumstances. In the embodiments, the polarization states of the various portions of the image light and the scene light are controlled in the see-through display assembly and the light control element such that a high percentage of scene light is allowed to pass into the see-through display assembly while a higher percentage of escaping light is blocked so that a bright see-through view is presented to the user and eyeglow is reduced. Considering that in some cases, the image light or the scene light may take on some elliptical polarization, it is reasonable to expect that the light control element blocks greater than 90% of the escaping light while allowing greater than 30% of the scene light to be transmitted.

The polarizing beam splitter in the embodiments discussed herein can be of several different types. While the examples shown in FIGS. 4, 6 and 8 show wiregrid plates or wiregrid films applied to support plates as the polarizing beam splitters, MacNeil prism type polarizing beam splitters can also be used.

In yet another embodiment, light absorbing structures are included on one or more of the edges of the frame 105 to absorb light that is reflected or scattered from the user's face. Where the light absorbing structures can include black areas or textured areas. The light absorbing structures can also be flexible to conform to the user's face.

| Table of numerals for figures | |
| --- | --- |
| 100 | see-through head mounted display device |
| 102 | clear areas of lenses |
| 105 | frames |
| 110 | lenses |
| 115 | display areas |
| 120 | camera |
| 125 | electronics |
| 127 | peripheral electronics |

-continued

Table of numerals for figures

| | |
|---|---|
| 130 | arms |
| 190 | externally observable image |
| 400 | see-through display assembly |
| 410 | user's eye |
| 420 | beam splitter layer |
| 430 | quarter wave film |
| 440 | partially reflective mirror |
| 450 | optical axis |
| 452 | optical axis |
| 460 | folding mirror |
| 465 | scene light |
| 470 | image light |
| 480 | light control element |
| 500 | see-through display assembly |
| 520 | image source |
| 530 | back surface of waveguide |
| 540 | partially reflective mirror |
| 550 | optical axis |
| 555 | waveguide |
| 560 | corrective element |
| 565 | scene light |
| 570 | image light |
| 580 | light control element |
| 652 | controllable darkening layer |
| 653 | quarter wave film |
| 654 | linear polarize |
| 690 | combined image light |
| 700 | light control element |
| 740 | support layer |
| 800 | glasses cross-section |
| 805 | glasses frame |
| 885 | supporting member |
| 887 | supporting member |
| 910 | step of providing image light to the partial mirror |
| 920 | step of reflecting and transmitting portions of image light |
| 930 | step of transmitting scene light through the light control element |
| 940 | step of transmitting and reflecting portions of scene light |
| 950 | step of combining image light and scene light to provide a combined image to the user |
| 960 | step of using the light control element to block escaping light |

The present disclosure has been very detailed with particular reference to certain embodiments thereof, but it will be understood that variations and modifications can be effected within the spirit and scope of the invention.

What is claimed is:

1. A see-through head mounted display apparatus with reduced eyeglow, comprising:
    a see-through display assembly including an image source and a partially reflecting mirror that reflects and transmits respective portions of image light from the image source and scene light from a see-through view of an external environment, so that a combined image comprised of portions of the reflected image light and the transmitted scene light is provided to a user's eye; and
    a light control element that blocks escaping light comprised of the transmitted portion of image light and the reflected portion of scene light, while permitting a portion of incoming scene light to be transmitted from the external environment to the see-through display assembly, wherein the transmitted percentage of incoming scene light is greater than the percentage of escaping light that is not blocked.

2. The apparatus of claim 1 wherein the light control element blocks greater than 90% of the escaping light while allowing greater than 30% of the scene light to be transmitted.

3. The apparatus of claim 1 wherein the light control element comprises a linear polarizer.

4. The apparatus of claim 3 wherein the light control element further comprises a first quarter wave film.

5. The apparatus of claim 1 wherein the partially reflecting mirror is a spherical or aspheric mirror.

6. The apparatus of claim 3 wherein the see-through display assembly further comprises a partially reflecting mirror beam splitter layer and the image source provides linearly polarized image light.

7. The apparatus of claim 4 wherein the see-through display assembly further comprises a polarizing beam splitter and a second quarter wave film disposed between the polarizing beam splitter and the partially reflecting mirror.

8. The apparatus of claim 7 wherein the image source provides linearly polarized image light that is aligned to reflect from the polarizing beam splitter prior to passing through the second quarter wave film, and the linear polarizer in the light control element is aligned to transmit light through the polarizing beam splitter after passing through the first and second quarter wave films.

9. The apparatus of claim 8 wherein the polarizing beam splitter is a MacNeil beam splitter.

10. The apparatus of claim 8 wherein the polarizing beam splitter is a wire grid polarizer.

11. The apparatus of claim 3 wherein the light control element further comprises a controllable darkening layer.

12. The apparatus of claim 11 wherein the controllable darkening layer is comprised of two or more separately controllable areas.

13. The apparatus of claim 3 wherein the light control element further comprises a photochromic layer.

14. The apparatus of claim 1 wherein the see-through display assembly further comprises light absorbing structures on at least one edge of the see-through display assembly.

15. The apparatus of claim 1 wherein the image source is a projector.

16. The apparatus of claim 15 wherein the projector has a folded optical path.

17. The apparatus of claim 3 wherein the see-through display assembly further comprises a waveguide and the image source provides linearly polarized image light.

18. The apparatus of claim 17 wherein the image light is reflected multiple times from different areas of the partially reflecting mirror.

19. The apparatus of claim 1 wherein the light control element is a separately replaceable element.

20. The apparatus of claim 1 wherein the light control element, the partially reflective mirror and the user's eye are located along a common optical axis.

21. The apparatus of claim 1 wherein the escaping light further comprises light reflected or scattered from the user.

22. The apparatus of claim 1 wherein the light control element includes a support layer with impact resistance, ballistic protection or laser protection.

23. A method for viewing an image with reduced eyeglow on a see-through head mounted display having a front and back, the method comprising:
    providing image light to a partially reflecting mirror from an image displayed on an image source;
    reflecting a first portion of the image light from the partially reflecting mirror while transmitting a second portion of the image light through the partially reflecting mirror;
    transmitting a first portion of scene light from an external environment through a light control element at the front of the see-through head mounted display;
    transmitting a second portion of the scene light through the partially reflecting mirror while reflecting a third portion of the scene light from the partially reflecting mirror;
    combining the first portion of the image light with the second portion of the scene light to provide a combined image to a viewer's eye at the back of the see-through head mounted display comprised of the image displayed on the image source overlaid on a view of the external environment; and using the light control element to block the transmitted second portion of the image light and the reflected third portion of the scene light to reduce eyeglow.

24. The method of claim 23 further comprising using the light control element to block greater than 90% of the transmitted second portion of the image light and the reflected third portion of the scene light, while allowing greater than 30% of the incoming scene light to be transmitted.

25. The method of claim 23 further comprising using the light control element to block light from the combined image that is reflected from the viewer.

26. The method of claim 23 further comprising providing a linear polarizer in the light control element to block portions of image light and scene light while transmitting portions of scene light.

27. The method of claim 26 further comprising providing an image source that provides linearly polarized image light.

28. The method of claim 27 further comprising providing a first quarter wave film in the light control element; and using the first quarter wave film to convert linearly polarized scene light to circularly polarized scene light.

29. The method of claim 27 further comprising aligning the light control element, the partially reflective mirror and the viewer's eye along a common optical axis.

30. The method of claim 29 further comprising providing a beam splitter layer for reflecting and redirecting a portion of the polarized image light along the common optical axis.

31. The method of claim 30 wherein the beam splitter layer is a polarizing beam splitter layer and further comprising disposing a second quarter wave film between the polarizing beam splitter layer and the partially reflecting mirror; and using the first and second quarter wave films to reverse a polarization state of the first and second portions of the image light and reverse a polarization state of the first, second and third portions of the scene light.

32. The method of claim 31 further comprising aligning the polarized image light and the linear polarizer in the light control element so that the first portion of the polarized image light with the reversed polarization state and the second portion of the scene light with the reversed polarization state are transmitted through the polarizing beam splitter layer.

33. The method of claim 23 further comprising providing in the light control element a controllable darkening layer to partially block the first portion of scene light thereby reducing scene light in a portion of the combined image.

34. The method of claim 23 further comprising providing in the light control element a photochromic layer to partially block the first portion of scene light thereby reducing scene light in the combined image.

35. The method of claim 23 wherein the step of providing image light to the partially reflecting mirror includes using a waveguide.

36. The method of claim 23 further comprising using an absorbing structure to absorb light that is reflected or scattered from the user.

* * * * *